US010519051B2

(12) United States Patent
Fahs, II et al.

(10) Patent No.: US 10,519,051 B2
(45) Date of Patent: *Dec. 31, 2019

(54) SYSTEMS AND METHODS FOR THE TREATMENT OF BALLAST WATER

(71) Applicant: FAHS STAGEMYER LLC, Woodstock, CT (US)

(72) Inventors: Richard W. Fahs, II, Woodstock, CT (US); Matthew D. W. Fahs, Woodstock, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/207,012

(22) Filed: Nov. 30, 2018

(65) Prior Publication Data

US 2019/0337826 A1 Nov. 7, 2019

Related U.S. Application Data

(63) Continuation of application No. 13/775,773, filed on Feb. 25, 2013, now Pat. No. 10,287,193, which is a
(Continued)

(51) Int. Cl.
*C02F 1/48* (2006.01)
*C02F 1/36* (2006.01)
*C02F 1/30* (2006.01)
*C02F 1/32* (2006.01)
*C02F 1/72* (2006.01)
(Continued)

(52) U.S. Cl.
CPC .............. *C02F 1/725* (2013.01); *C02F 1/001* (2013.01); *C02F 1/30* (2013.01); *C02F 1/325* (2013.01); *C02F 1/36* (2013.01); *C02F 1/004* (2013.01); *C02F 2101/16* (2013.01); *C02F 2103/008* (2013.01); *C02F 2201/322* (2013.01); *C02F 2201/326* (2013.01); *C02F 2201/3226* (2013.01); *C02F 2303/04* (2013.01); *C02F 2305/10* (2013.01)

(58) Field of Classification Search
CPC .......... B01D 15/00; C02F 1/36; C02F 1/4608; C02F 1/46109; C02F 1/48; C02F 1/30; C02F 1/32; C02F 1/725; C02F 1/001; C02F 1/325; C02F 1/004; C02F 2101/16; C02F 2103/008; C02F 2201/322; C02F 2201/3226; C02F 2201/326
USPC ....... 210/748, 748.01, 251, 542, 257.1, 153, 210/243, 600
See application file for complete search history.

(56) References Cited

U.S. PATENT DOCUMENTS 5,211,821 A * 5/1993 Jacobson ............... B01D 53/70
204/157.41
2003/0217978 A1* 11/2003 Safta ....................... C02F 1/325
210/202

* cited by examiner

*Primary Examiner* — Robert Clemente
*Assistant Examiner* — Akash K Varma

(57) ABSTRACT

A system has been developed to treat ballast water by selectively dissociating target molecules into component products compositionally distinct from the target molecule, wherein the bonds of the target molecule do not reform because the components are no longer reactive with each other. Dissociation is affected by treating the target molecule with light at a frequency and intensity, alone or in combination with a catalyst in an amount effective to selectively break bonds within the target molecule. Dissociation does not result in re-association into the target molecule by the reverse process, and does not produce component products which have a change in oxidation number or state incorporated oxygen or other additives because the process does not proceed via a typical reduction-oxidation mechanism.

20 Claims, 6 Drawing Sheets

Related U.S. Application Data continuation-in-part of application No. 13/404,929, filed on Feb. 24, 2012, now Pat. No. 9,073,766, which is a continuation-in-part of application No. 12/861,524, filed on Aug. 23, 2010, now Pat. No. 8,202,500.

(60) Provisional application No. 61/715,640, filed on Oct. 18, 2012, provisional application No. 61/236,592, filed on Aug. 25, 2009, provisional application No. 61/306,281, filed on Feb. 19, 2010, provisional application No. 61/315,262, filed on Mar. 18, 2010.

(51) Int. Cl.
*C02F 1/00* (2006.01)
*C02F 101/16* (2006.01)
*C02F 103/00* (2006.01)

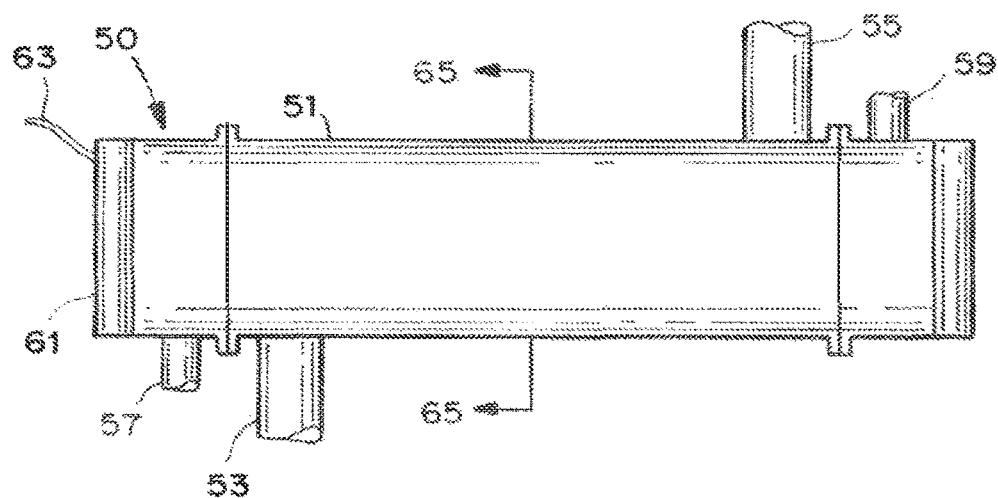
FIG. 3A
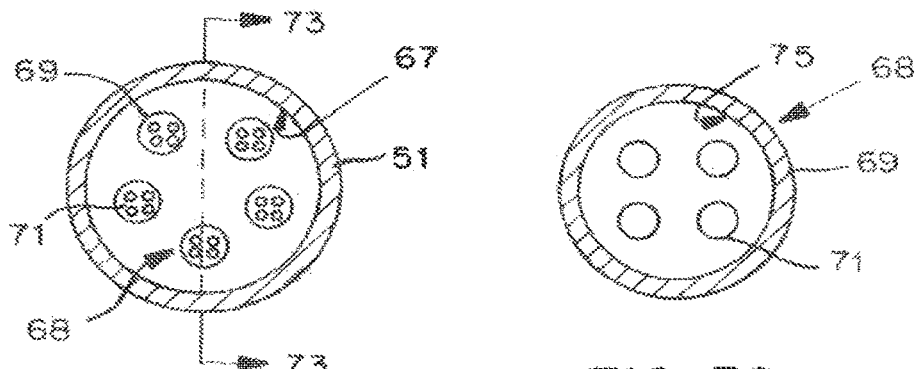
FIG. 3B
FIG. 3C
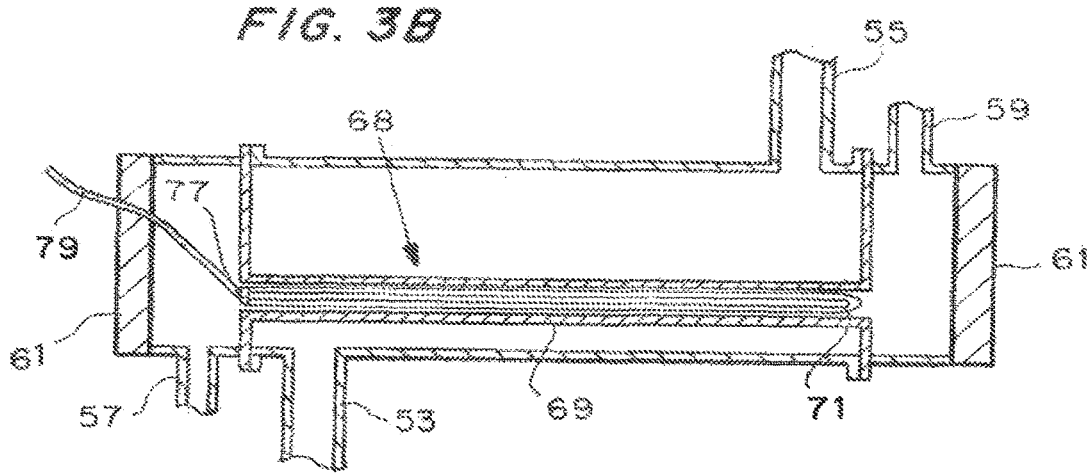
FIG. 3D

SYSTEMS AND METHODS FOR THE TREATMENT OF BALLAST WATER

CROSS-REFERENCE TO RELATED APPLICATIONS

This application claims priority to and is a continuation of U.S. application Ser. No. 13/775,773, entitled "Systems and Methods for the Treatment of Ballast Water," which was filed on Feb. 25, 2013, granted on May 14, 2019 as U.S. Pat. No. 10,287,199 which claims priority to U.S. Provisional Application No. 61/715,640, filed Oct. 18, 2012, and is a continuation-in-part of U.S. patent application Ser. No. 13/404,929, filed Feb. 24, 2012, now patented, U.S. Pat. No. 9,073,766, issued Jul. 7, 2015; which is a continuation-in-part of U.S. patent application Ser. No. 12/861,524, filed Aug. 23, 2010, now patented, U.S. Pat. No. 8,202,500, issued Jun. 19, 2012; which claims priority to U.S. Provisional Application No. 61/236,592 filed Aug. 25, 2009, U.S. Provisional Application No. 61/306,281 filed Feb. 19, 2010, and U.S. Provisional Application No. 61/315,262 filed Mar. 18, 2010. These applications are incorporated herein by reference. This application is further related to U.S. patent application Ser. No. 13/524,950 filed Jun. 15, 2012 and issued on May 14, 2013 as U.S. Pat. No. 8,440,154; U.S. patent application Ser. No. 14/790,506 filed Jul. 2, 2015 and issued on May 10, 2016 as U.S. Pat. No. 9,334,183; U.S. patent application Ser. No. 14/057,997 filed Oct. 18, 2013; and U.S. patent application Ser. No. 15/876,177 filed Jan. 21, 2018.

FIELD OF THE INVENTION

The present invention relates to systems and methods for ballast water remediation, particularly those based on processes for dissociating target molecules in ballast water into ions or elements.

BACKGROUND OF THE INVENTION

Ballasting is a standard shipping practice. Upon departure from a port, ballast water is pumped into ballast tanks located in the hull of the ship. The ballast water provides additional weight to increase the stability and maneuverability of ships at sea. Ballast water is later discharged just before reaching the destination port to reduce the vessel's draft, allowing the ship to navigate in shallower water.

Though a common practice, ballasting has significant negative environmental consequences. During the loading of ballast water at the port of origin, pollutants and marine organisms present in the water column and harbor floor can be sucked into the ballast tanks of ships. Upon deballasting, these marine organisms and pollutants are released at the ship's destination.

Ballast water has been shown to harbor chemical pollutants, including volatile organic compounds (VOCs), as well as marine organisms ranging from microscopic organisms such as plankton, bacteria, and protozoans, to macroscopic organisms including shellfish and aquatic plant life. Aquatic invasive species (AIS) can be introduced into environments via ballast water with devastating environmental and economic consequences. The introduction of the zebra mussel into the Great Lakes of the United States is a well-publicized example of the environmental impact posed by AIS carried by ballast water.

Ballast water taken into a tank from one body of water and discharged in another body of water can introduce invasive species of aquatic life. The discharge of water from ballast tanks has been responsible for the introduction of species that cause environmental and economic damage. The International convention for the control and management of ships' ballast water and sediments in 2004 tries to deal with this environmental problem, by regulating the discharge and charge of ballast water. Ships must comply with the regulations in effect and change their ballast water when they sail in high seas. The exchange should be made by high depth (more than 2000 meters) so far as possible, during the day and as far away from the littoral zone as possible. To avoid stability or mechanical stress problems, there are two options for the replacement of ballast water: empty the whole tank and fill it, or without emptying the tank, proceed with the filling by allowing the overflow to come out through the air outflow, in which case three times the volume of the tank has to be exchanged.

To mitigate the potential impact of ballast water, ballast water can be treated before it is discharged. Existing methods for the remediation of ballast water are similar to methods used to treat water in other applications, and include chemical disinfection, ultraviolet (UV) irradiation, filtration, deoxygenation, microagitation, and electrochlorination. However, all of these existing methods possess significant drawbacks.

Chemical disinfection involves contacting ballast water with a chemical disinfectant such as chlorine, ozone, peracetic acid, or menadione, prior to discharge. Because the disinfected ballast water is ultimately expelled from the vessel, the chemical disinfectant added to the ballast water, as well as any byproducts formed during ballast water treatment, are also discharged. Absent additional remediation, chemically disinfected water can be destructive to ecosystems. In addition, chemical disinfection requires the storage of hazardous chemicals on board ships, which takes up valuable storage space and requires special handling and disposal methods, as well as presents risks to human health and the environment.

Ballast water can also be irradiated with ultraviolet (UV) light. However, this method requires the transmission of UV light through the ballast water. As a result, UV irradiation cannot effectively sterilize turbid water. In addition, UV irradiation of ballast water requires significant power consumption, and a large footprint in the case of systems requiring a high volumetric flow rate.

Deoxygenation involves removing all of the oxygen from ballast water prior to discharge in order to asphyxiate any marine organisms in the water. Deoxygenation is a lengthy process, typically requiring days to complete. In addition, water must be re-oxygenated prior to discharge. Finally, this method will not eliminate chemical pollutants, such as VOCs, or organisms that do not require oxygen to survive.

Microagitation involves the formation of microbubbles in a flowing liquid. The collapse of the microbubbles disrupts the cell walls of microorganisms, eliminating microorganisms present in the ballast water. However, microagitation is energy intensive, and requires careful engineering. In addition, microagitation will not eliminate chemical pollutants, such as VOCs, present in the ballast water.

In electrochlorination (also referred to as electrolytic disinfection), direct current is applied to the ballast water. Seawater contains dissolved sodium chloride. The applied electric current reacts with the dissolved sodium chloride to form sodium hypochlorite (i.e., bleach) which sterilizes the ballast water. This method is effective at neutralizing species in the ballast water and does not require the storage of hazardous chemicals. However, electrochlorination is energy intensive. Significant quantities of energy are required to form an effective concentration of bleach in ballast water. In addition, electrochlorination performance is reduced at temperatures between 10-15° C. [50-59° F.] and does not function at all below 5° C. [41° F.]. Therefore, additional energy is typically required to heat ballast water to above 15° C. [59° F.], a temperature range at which electrochlorination is efficient. Finally, electrochlorination systems typically discharge effluent containing bleach, which can be destructive to marine ecosystems.

Accordingly, there is a need for systems and devices for the simple, safe, energy efficient, cost-effective, and environmentally benign remediation of water, particularly ballast water.

It is therefore the object of the invention to provide improved systems for the remediation of water, including ballast water.

It is further an object of the invention to provide systems for the remediation of water, including ballast water, which can simultaneously eliminate chemical pollutants and biological contaminants.

It is also an object of the invention to provide systems for the remediation of water, including ballast water, which can effectively eliminate chemical pollutants and biological contaminants without generating intermediates or byproducts which require further remediation.

It is also an object of the invention to provide systems for the remediation of water, including ballast water, which do not require the addition of chemical reagents.

SUMMARY OF THE INVENTION

Methods for the efficient remediation of water, including the ballast water in marine vessels, are simple, safe, energy efficient, cost-effective, and environmentally benign. The methods for the remediation of water involve the irradiation of water containing one or more biological contaminants, chemical contaminants, or combination thereof with energy at a frequency and intensity in an amount effective to selectively break one or more bonds within a target molecule. Any suitable energy source can be used to irradiate contaminated water, provided that the energy source provides energy at the desired frequency and intensity to dissociate one or more bonds within a given molecule. In preferred embodiments, the energy is in the form of light. In certain embodiments, a pulsed light of a particular frequency and intensity (e.g., a nano- or picosecond burst of light) or tunable laser is used to selectively induce photo-dissociation of one or more target molecules to eliminate one or more contaminants present in the water. The water can be irradiated by energy in the absence of a catalyst. Alternatively, the water can be irradiated in the presence of a catalyst. In embodiments where a catalyst is used, the catalyst can be dispersed throughout the water or immobilized on a heterogeneous support.

In the case of water containing a chemical contaminant, the target molecule is typically a chemical pollutant, such as volatile organic compound, present in the water. In order to eliminate a chemical contaminant from a water sample, energy is introduced at a frequency and intensity to selectively dissociate one or more target bonds in the target molecule, causing the target molecule to dissociate into component products compositionally distinct from the target molecule. Generally, the bonds of the target molecule do not reform because the components are no longer reactive with each other. The process does not produce component products by oxidation or reduction process, exchange of electrons, or a change in oxidation state of the molecule which has incorporated oxygen or other additives because the process does not proceed via a typical reduction-oxidation mechanism.

In the case of water containing a biological contaminant, the target molecule may be a portion of a biomolecule which is itself a contaminant present in the water, such as a protein, polysaccharide, or polynucleotide, or a portion of a biomolecule, such as a protein, DNA, or RNA, located within an infectious agent or organism contaminating the water. Energy is introduced at a frequency and intensity to selectively dissociate one or more target bonds in the target molecule, causing the target molecule to dissociate into component products compositionally distinct from the target molecule. Generally, the bonds of the target molecule do not reform because the components are no longer reactive with each other. In the case of biological contaminants such as infectious agent and organisms, the target molecule will preferably be a portion of a biomolecule essential for the function and/or survival of the infectious agent or organism. By selectively dissociating one or more target bonds in the target molecule, the infectious agent or organism is selectively killed or rendered inactive using the method. In certain embodiments, sample containing one or more biological contaminants is sterilized using the method.

By irradiating a contaminated water sample with energy at specific frequencies and intensities, target molecules can be selectively dissociated in a complex mixture. In some embodiments, water is irradiated with energy at multiple discrete frequencies and intensities in order to selectively dissociate one or more bonds within multiple different target molecules. For example, a water sample can be irradiated to simultaneously eliminate both chemical pollutants and biological contaminants in a water sample.

In certain embodiments, the method effectively eliminates chemical pollutants, biological contaminants, and combinations thereof in a contaminated water sample without generating intermediates or byproducts which require further remediation. The method can further include purification, for example, to remove the resultant component products or remove catalyst, if present.

The method can be used to remediate contaminated samples, including liquid effluents, for example, wastewater, aquaculture water, ballast water, industrial runoff, and agricultural runoff, which contains at least one undesirable or otherwise unwanted biological or chemical contaminant. In other embodiments, the method is used to remediate solid waste, sludge waste, biomedical waste, landfill waste, and polluted soil.

In certain embodiments, ballast water containing one or more chemical contaminants, biological contaminants, or combinations thereof is remediated with irradiated energy at a frequency and intensity in an amount effective to selectively break one or more bonds within one or more target molecules. In doing so, one or more chemical contaminants, biological contaminants, or combinations thereof present in the ballast water are eliminated or otherwise rendered environmentally benign. Preferably, the ballast water is irradiated during ballast water discharge. Preferably, the energy source for ballast water irradiation is incorporated into the means for ballast water discharge, such that ballast water treatment operates interruption-free with a high volumetric flow rate of water. In certain embodiments, the ballast water treatment operates interruption-free with a volumetric flow rate of greater than 1,000 cubic meters per hour, more preferably greater than 2,500 cubic meters per hour, more preferably greater than 4,000 cubic meters per hour, more preferably greater than 5,000 cubic meters per hour, most preferably greater than 6,000 cubic meters per hour. In preferred embodiments the ballast water treatment system operates with a volumetric flow rate of 1,000-10,000 cubic meters per hour, more preferably with a volumetric flow rate of 4,000-6,000 cubic meters per hour. In certain embodiments, this method further involves filtration of the ballast water to remove macroscopic contaminants. In some embodiments, systems are provided that can remediate the ballast water both during ballasting (before water is stored in the ballast tanks) and during de-ballasting (before the water is discharged). In some embodiments, systems are provided that remediate the ballast water once it is in the ballast tank. The systems effectively eliminate chemical pollutants and biological contaminants in ballast water without requiring the addition of chemical reagents and/or the heating or cooling of ballast water.

BRIEF DESCRIPTION OF THE DRAWINGS

FIG. 3A is a diagrammatic elevation view of an exemplary precise energy separation chamber. Water to be treated flows into the chamber through an inlet port positioned near one end, flows through the interior of the chamber and in the proximity of a plurality of energy of dissociation sources, and exits through an outlet port positioned near the opposite end. FIG. 3B is a diagrammatic sectional view taken generally along 65-65 in FIG. 3A. FIG. 3C is a diagrammatic detailed sectional view of an energy of dissociation source taken generally along 65-65 in FIG. 3A. FIG. 3D is a diagrammatic sectional view taken generally along 73-73 in FIG. 3B.

Figure 1:
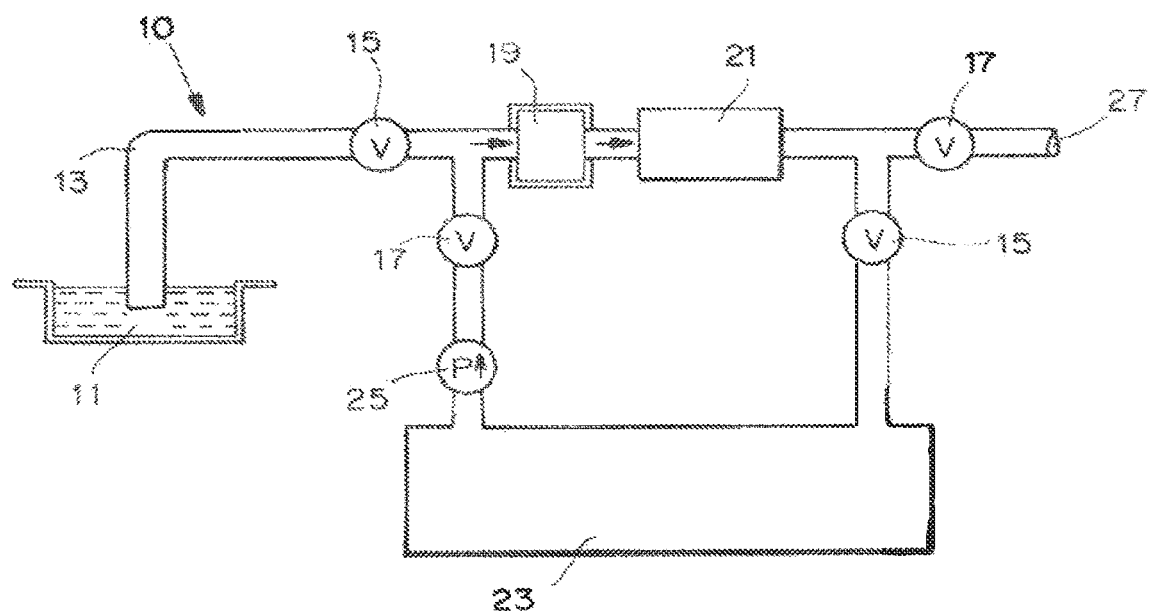
FIG. 1 is a schematic of a prototypical ballast water treatment system containing a precise energy separation unit and a filter that allows for water remediation both during ballasting and during de-ballasting.

The devices in FIGS. 4A-4B, 5A-5B, and 6A-6B differ from each other by virtue of the positioning of the inlet and outlet ports.

DETAILED DESCRIPTION OF THE INVENTION

I. Definitions

"Biological contaminant," as used herein, refers to a contaminant of biological origin. The term "biological contaminant" encompasses biomolecules, such as proteins, polysaccharides, and polynucleotides, infections agents, such as viruses, as well as single and multi-celled organisms, such as bacteria, protozoa, plankton, fish, insects, bivalve and other animals.

"Bond dissociation energy," as used herein, refers to the standard enthalpy change when a bond is homolytically cleaved.

"Bond energy," as used herein, refers to the average of the sum of the bond dissociation energies in a molecule.

"Component products," as used herein, refers to known ions or atoms composed of only elements found within the target molecule. Individual component products have a chemical formula distinct from the target molecule. An example is $N_2$ and $H_2$, which are each component products of $NH_3$.

"Catalyst," as used herein refers, to any material which enhances the rate and/or efficiency of molecular dissociation compared with the rate and/or efficiency of dissociation in the absence of the catalyst.

"Chemical waste," as used herein, refers to any inorganic or organic substance, present in any physical state, that is unwanted or undesirable in a given sample due to environmental or toxicity concerns.

"Dissociation," as used herein, refers to breaking the bonds of a molecule. Dissociation in the current process generally requires that the original bonds of the target molecule do not re-associate or reform.

"Excited state," as used herein, refers to a state in which one or more electrons of an atom or molecule are in a higher-energy level than the ground state.

"Irradiation," as used herein, refers to exposing a sample to beams of particles or energy, such as a form of electromagnetic or acoustic radiation. In certain embodiments, irradiation involves exposing a sample to light.

"Nanoparticle", as used herein, refers to particle or a structure in the nanometer (nm) range, typically from about 0.1 nm to about 1000 nm in diameter.

"Non-target molecule," as used herein, refers to the any substance within a sample containing target molecules which is not affected by the process.

"Promoter," as used herein, refers to the energy required for dissociation of a target bond, which is both selective for the target bond and sufficient to prevent re-association or re-formation of the bond.

"Energy of dissociation source," as used herein, refers to any chemical, apparatus, or combination thereof, which supplies the energy of dissociation required to dissociate target bonds within a target molecule. The energy of dissociation source must supply suitable intensity and suitable frequency for target bond dissociation. An example of an energy of dissociation source is a xenon lamp coupled to a pulse generator. An energy of dissociation source can optionally contain a catalyst. An example of such an energy of dissociation source is a titanium dioxide catalyst and a xenon lamp coupled to a pulse generator.

"Precise Energy Separation (PES) Technology", as used herein, refers to the use of highly specific energy to selectively cleave specific bonds to dissociate a target.

"Remediation," as used herein, refers to treatment of water, such as ballast water, wastewater, or drinking water, to decrease the concentration of one or more undesirable contaminants. The contaminants can be biological or chemical contaminants.

"Sample" as generally used herein refers to at least one target molecule which is subjected to the dissociation process. A sample can comprise both target and non-target molecules.

"Target bond," as used herein, refers to any bond within a target molecule. Target bonds can be covalent (including single and multiple covalent bonds), ionic, or "weak bonds" including dipole-dipole interactions, London dispersion forces, or hydrogen bonding. In certain embodiments, the target bonds are covalent bonds.

"Target molecule" as used herein refers to a molecule, or portion of a macromolecule, that contains at least one bond.

"Volatile organic compound" (VOC), as used herein, refers to organic compounds with high enough vapor pressure to evaporate and enter the atmosphere at ambient temperature and pressure. Examples of VOCs include low-molecular weight organic compounds such as alcohols, esters, ethers, aldehydes, thiols, and ketones.

"Ballast water" refers to fresh or salt water, sometimes containing sediments, held in tanks and cargo holds of ships to increase stability and maneuverability during transit.

The terms "ballast water performance standard" and "performance standard," as used interchangeably herein, refer to standards established by the United Nations' International Maritime Organization that ships are to satisfy when conducting ballast water management. The ballast water performance standard, abbreviated "BWPS" for short, specifies that ships conducting ballast water management shall discharge less than 10 viable organisms per cubic meter greater than or equal to 50 micrometers in minimum dimension and less than 10 viable organisms per milliliter less than 50 micrometers in minimum dimension and greater than or equal to 10 micrometers in minimum dimension. In addition to this, the discharge of the indicator microbes shall not exceed less than 1 colony forming unit (cfu) per 100 milliliters or less than 1 cfu per 1 gram (wet weight) zooplankton samples; *Escherichia coli* less than 250 cfu per 100 milliliters; intestinal Enterococci less than 100 cfu per 100 milliliters).

The terms "ballast water exchange standard" and "exchange standard," as used interchangeably herein, refer to standards established by the United Nations' International Maritime Organization that ships are satisfy when conducting ballast water exchange. The ballast water exchange standards, abbreviated "BWES" for short, specify ships performing ballast water exchange shall do so with an efficiency of 95% volumetric exchange of ballast water. For ships exchanging ballast water by the pumping-through method, pumping through three times the volume of each ballast water tank shall be considered to meet the standard described. Pumping through less than three times the volumne may be accepted provided the ship can demonstrate that at least 95% volumetric exchange is met.

The term "turbidity", as used herein, is a measure of water quality that depends primarily upon the amount of fine suspended particles in the water. High turbidity may be caused by particles of clay, silt, organic or inorganic matter, plankton, or other microscopic organisms. The standard unit of measurement for turbidity is Nephelometric Turbidity Unit (NTU). Suspended particles will scatter a light beam focused on them, thereby providing a meaningful measure of turbidity in water. Turbidity measured this way uses an instrument called a nephelometer. A nephelometer is an instrument for measuring suspended particulates in a liquid or gas by employing a light beam (source beam) and a light detector set to one side (often 900) of the source beam. Particle density is then a function of the light reflected into the detector from the particles. Highly turbid water supports the growth of many bacteria and viruses. Bacteria, viruses and parasites such as *giardia* and *cryptosporidium* can attach themselves to the suspended particles in turbid water. Suspended particles can also interfere with water treatment.

II. Target Compositions

Methods for remediation of contaminated samples, such as water samples, involve the irradiation of a sample containing one or more biological contaminants, chemical contaminants, or combinations thereof with energy at a frequency and intensity in an amount effective to selectively break one or more bonds within a target molecule(s).

An atom is ionized by absorbing a photon of energy equal to or higher than the ionization energy of the atom. Multiple photons below the ionization threshold of an atom may combine their energies to ionize an atom by a process known as multi-photon ionization. These concepts also apply to molecules. Resonance enhanced multi-photon ionization (REMPI) is a technique in which a molecule is subject to a single resonant or multi-photon frequency such that an electronically excited intermediate state is reached. A second photon or multi-photon then ejects the electronically excited electron and ionizes the molecule.

Among a mixture of molecules with different bond dissociation energies, selective activation of one chemical bond requires a mono-chromatic source. For example, in a compound containing N—H (bond dissociation energy of 3.9 eV) and C—H (bond dissociation energy of 4.3 eV) bonds, a specific photon source of 4.0 eV dissociates the N—H bond exclusively.

The process described herein relies on two main principles. The first principle is that the dissociation of target molecules requires breaking multiple bonds. Thus, a plurality of photons or other energetic sources are absorbed by a given molecule. The second principle is that dissociation of molecules in a complex mixture can be achieved with specific selection of the energy for dissociation (both frequency and intensity), defined herein as the promoter.

A. Target Molecules

The methods described herein are used to dissociate one or more bonds in almost any molecule, permitting the remediation of virtually any medium containing chemical and/or biological contaminants.

Target molecules must contain at least one bond to be dissociated. Target molecules can be any compound which is a water contaminant or a portion of a water contaminant. Target molecules can be charged or uncharged. Target molecules can be naturally occurring or synthetically prepared compounds.

In some cases, the target molecule is a chemical contaminant, such as volatile organic compound, present in the sample. Examples of chemical contaminants that can be targeted using the methods described herein include alkyl sulfonates, alkyl phenols, ammonia, benzoic acid, carbon monoxide, carbon dioxide, chlorofluorocarbons, dioxin, fumaric acid, grease, herbicides, hydrochloric acid, hydrogen cyanide, hydrogen sulfide, formaldehyde, methane, nitrogenous wastes (e.g., sewage, waste water, and agricultural runoff), nitric acid, nitrogen dioxide, ozone, pesticides, polychlorinated biphenyls, oil, ozone, sulfur dioxide, and sulfuric acid. Target molecules can be reactive or volatile aliphatic or aromatic organic compounds. In certain embodiments, the target molecule is a low-molecular weight organic compound, such as an alcohol, ester, ether, aldehyde, thiol, carboxylic acid, amine, amide, or ketone. The target molecule can also be a pharmaceutically active compound, or metabolite thereof.

In the case of samples containing a biological contaminant, the target molecule may be a portion of a biomolecule which is itself a contaminant present in the water, such as a protein, polysaccharide, or polynucleotide. The target molecule may also be a portion of a biomolecule, such as a protein, DNA, or RNA, located within an infectious agent or organism contaminating the sample. In the case of biological contaminants such as infectious agents and organisms, the target molecule will preferably be a portion of a biomolecule essential for the function and/or survival of the infectious agent or organism. By selectively dissociating one or more target bonds in the target molecule, the infectious agent or organism is selectively killed or rendered inactive using the method.

B. Target Bond

A target bond is any bond within a target molecule. Types of bonds affected by the dissociative process described herein include covalent, ionic, van der Waals, hydrogen bonding, or London dispersion forces or any bond which can form and has dissociation energy or energies if applied will break the bond and not allow the reformation of the bond.

Generally, the target bond is a covalent bond. The covalent bond can be a single bond, double bond, or triple bond. A non-limiting list of exemplary target bonds include N—H, C—H, C—C, C=C, C≡C, C—N, C=N, C≡N, C—O, C=O, C≡O, O—H, O—P, O=P, and C—X bonds, where X is any halogen selected from chlorine, fluorine, iodine, and bromine.

The energy of dissociation must be specific for the target bond of the target molecule. Bond dissociation energies are well known in the art. Examples of bond dissociation energies include H—H, 104.2 kcal/mol; B—F, 150 kcal/mol; C=C, 146 kcal/mol; C—C, 83 kcal/mol; B—O, 125 kcal/mol; N=N, 109 kcal/mol; N—N, 38.4 kcal/mol; C—N, 73 kcal/mol; O=O, 119 kcal/mol; 0-0, 35 kcal/mol; N—CO, 86 kcal/mol; C=N, 147 kcal/mol; F—F, 36.6 kcal/mol; C—O, 85.5 kcal/mol; C=O (CO2), 192 kcal/mol; Si—Si, 52 kcal/mol; O—CO, 110 kcal/mol; C=O (aldehyde), 177 kcal/mol; P—P, 50 kcal/mol; C—S, 65 kcal/mol; C=O (ketone), 178 kcal/mol; S—S, 54 kcal/mol; C—F, 116 kcal/mol; C=O (ester), 179 kcal/mol; Cl—Cl, 58 kcal/mol; C—C, 181 kcal/mol; C=O (amide), 179 kcal/mol; Br—Br, 46 kcal/mol; C—Br, 68 kcal/mol C=O (halide), 177 kcal/mol; I—I, 36 kcal/mol; C—I, 51 kcal/mol; C=S (CS2), 138 kcal/mol; H—C, 99 kcal/mol; C—B, 90 kcal/mol; N=O (HONO), 143 kcal/mol; H—N, 93 kcal/mol; C—Si, 76 kcal/mol; P=O (POCl₃), 110 kcal/mol; H—O, 111 kcal/mol; C—P, 70 kcal/mol; P=S (PSCl₃), 70 kcal/mol; H—F, 135 kcal/mol; N—O, 55 kcal/mol; S=O (SO₂), 128 kcal/mol, H—Cl, 103 kcal/mol; S—O, 87 kcal/mol; S=O (DMSO), 93 kcal/mol; H—Br, 87.5 kcal/mol; Si—F, 135 kcal/mol; P≡P, 84 kcal/mol; H—I, 71 kcal/mol; Si—Cl, 90 kcal/mol; P=P, 117 kcal/mol; H—B, 90 kcal/mol; Si—O, 110 kcal/mol; C≡O, 258 kcal/mol; H—S, 81 kcal/mol; P—Cl, 79 kcal/mol; C≡C, 200 kcal/mol; H—Si, 75 kcal/mol; P—Br, 65 kcal/mol; N≡N, 226 kcal/mol; H—P, 77 kcal/mol; P—O, 90 kcal/mol; C≡N, 213 kcal/mol.

In one embodiment, target bonds are dissociated heterolytically by the process described herein. When heterolytic cleavage occurs, ionic component products may be produced in addition to radicals and ejected electrons, for example:

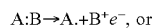

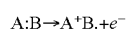

The radicals can re-associate to form A:B, but in the preferred embodiment, the radicals re-associate in a homomeric fashion to form A:A and B:B component products. One, two, or more identical radicals can associate to form known ions, atoms, or molecules.

In some embodiments, target molecules contain multiple non-identical atoms, multiple oxidation states, or combinations thereof, all of which contain a variety of types of target bonds. Examples of target molecules with non-identical target bonds containing multiple non-identical atoms are dichloroethane ($CH_2Cl_2$) and ethanolamine ($OHCH_2CH_2NH_2$). Examples of target molecules with non-identical target bonds with multiple oxidation states include ethyl acetylene $HC≡CH_2CH_3$ and ethyl isocyanate ($CH_3CH_2N=C=O$). In some embodiments, the target molecule is present in a range from 1 part per billion (ppb) or lower to very high concentrations of 1000 parts per million (ppm) or higher. The target molecule in some embodiments is present at concentrations of 1 nM or lower to concentrations over 1 mM. Those skilled in the art will recognize the energy of dissociation intensity and duration of energy of dissociation treatment will need to be adjusted based on the concentration of target molecules in a sample. Higher concentrations of target molecules are successfully dissociated by increasing the energy of dissociation power (wattage), increasing exposure time to the promoter, or a combination thereof.

Those skilled in the art will also recognize the energy of dissociation intensity and duration of energy of dissociation treatment will need to be adjusted based on the exposure time of the contaminated sample to the promoter.

III. Energy of Dissociation and Energy Sources

The energy of dissociation is the energy required for dissociation of a target molecule, and is specific for the target bond or bonds within a target molecule. The energy of dissociation is tunable and specific for the bond dissociation energy of any target bond within any target molecule.

The energy of dissociation is applied at a frequency and intensity effective for both scission of the target bond and target molecule dissociation.

In an example, the target molecule is AB, and application of the energy of dissociation specific for the A-B bond results in ejection of an electron from the target bond yielding a radical, an ion, and an electron, according to the following possible mechanisms:

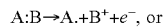

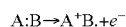

The ions and radicals can be stable isolatable species, or transient species which can combine with other ions to form molecules, i.e. the component products. The ejected electrons can be captured by an electron sink. The intensity of the energy of dissociation must be such that re-association or re-formation of components back into the target molecules does not occur.

In one embodiment, application of the energy of dissociation satisfies the bond dissociation energy of the target bond of a target molecule via a one step electronic process, and the target bond is dissociated. Once one target bond has been dissociated, the energy of dissociation source can be tuned to the frequency of a second target bond dissociation energy and applied to the sample to affect dissociation of a second target bond. The energy of dissociation sources can be tuned as needed to dissociate all target bonds of the target molecule. There are numerous apparatuses that can provide multi-energy photons within a nano second or quicker to effect irreversible dissociation and prevent formation of reactants from the dissociated target molecule components.

In another embodiment, application of the energy of dissociation satisfies the bond dissociation energy of the target bond of a target molecule via a process involving the Rydberg excited state of the target molecule. First, the energy of dissociation source excites the target molecule to a Rydberg state, wherein the energy required to nearly remove an electron from the ionic core (the ionization or dissociation energy) of a target molecule has been achieved. Next, the same or different energy of dissociation source then supplies sufficient energy to eject the excited electron from the target bond. In this embodiment, one or more energy of dissociation sources can be used for each step. Once one target bond has been dissociated, the energy of dissociation source can be tuned to the frequency of a second target bond dissociation energy. The energy of dissociation sources can be tuned as needed to dissociate all target bonds of the target molecule.

For example, treatment of ammonia with an energy of dissociation occurs via the two-step process involving the Rydberg State. First, energy of dissociation treatment of 193 nm excites a shared electron in the N—H bond such that ammonia is in an excited Rydberg state. Subsequent energy of dissociation treatment of 214 nm energy expels the electron and dissociates ammonia into $NH_2^-$ and H. Subsequent dissociative processes will give component products which re-associate to form $N_2$ and $H_2$.

In one embodiment, the one-step process, the two-step process, or a combination thereof are used to dissociate the target molecule. In one embodiment, one or more energy of dissociation sources are used for dissociation of each target bond within a target molecule. In one embodiment, one or more energy of dissociation sources are used in combination for dissociation of each target bond within a target molecule.

An exemplary molecule contains N—H, C—O, and O—H bonds. The N—H bond is cleaved with application of a 193 nm and 214 nm xenon bulb energy of dissociation source. The C—O bonds are cleaved with a mono-chromatic pulse generator. The O—H bonds are cleaved with a combination of photocatalyst and UV radiation. All of these energy of dissociation sources comprise the energy of dissociation required for complete dissociation of all the bonds of the target molecule. In some cases this requires three or more bond energies to expel the electron. In some cases, a filter may be used to isolate wavelengths or energies from a wide range source.

A. Energy of Dissociation Sources

An energy of dissociation source provides the energy of the promoter. The energy of dissociation source delivers irradiative energy, catalysis, or combinations thereof. An energy of dissociation source supplies the energy of dissociation with electromagnetic energy, acoustic energy, or any other energy which meets the bond dissociation energy of the target bond. The energy of dissociation source energy is selected from a non-exclusive list including photonic, photocatalytic, chemical, kinetic, potential, magnetic, thermal, gravitational, sound, light, elastic, DC or AC modulation current (electrical), plasma, ultrasound, piezoelectric, or electrochemical energy.

Energy of dissociation sources include any apparatus which can supply the specific bond dissociation energy to break target bonds of target molecules specifically without non-target molecule bonds being affected. Examples include mono-chromatic light, monotone sound, or any other mono-energy source.

In one embodiment, an energy of dissociation source is applied at the appropriate frequency and intensity to attain a multi-photon or multi-frequency energy of dissociation within a rapid time scale through use of a generator of nano to femto-pulse or even attosecond pulse cycles.

In some embodiments, energy of dissociation sources can be frequency generators, electrical generators, plasma generators, arc lamps, pulse generators, amplifying generators, tunable lasers, ultraviolet lamps, ultraviolet lasers, pulse ultraviolet generators, and ultrasound generators.

In some embodiments, the energy of dissociation source is one or more reactor beds having any number of lamps, generators, and/or bulbs; lamps, generators, and/or bulbs having the same or different sizes in terms of diameter and length; lamps, generators, and/or bulbs having the same or different wattages and/or any combination of the foregoing. The lamps, generators, and/or bulbs useful in this method can be any shape, size, or wattage. For example, a pulse light source allows one to use a 10 watt input of energy and generate 400,000 watts of pulse energy within ⅓ of a second of output, thereby reducing energy usage and equipment size and cost.

In preferred embodiments, the energy of dissociation source is a pulse tunable laser or diode attached to a pulse generator.

Those skilled in the art will recognize the nature of the target bond and target molecule will determine the identity, frequency, and intensity of energy of dissociation source.

In one embodiment, photocatalytic processes use ultraviolet light promoters, supplied by ultraviolet energy of dissociation sources that are positioned to emit photons of ultraviolet light. The ultraviolet light sources are generally adapted to produce light having one or more wavelengths within the ultraviolet portion of the electromagnetic spectrum. However, the method should be understood as including ultraviolet light sources that may produce other light having one or more wavelengths that are not within the ultraviolet portion (e.g., wavelengths greater than 400 nm) of the electromagnetic spectrum.

In other photocatalytic processes, the energy of dissociation source is replaced by other devices, such as lamps or bulbs other than ultraviolet fluorescent lamps or bulbs; non-ultraviolet light emitting diodes; waveguides that increase surface areas and direct ultraviolet light and any energy light source that activates a photocatalyst; mercury vapor lamps; xenon lamps; halogen lamps; combination gas lamps; and microwave sources to provide sufficient energy to the photocatalyst substance to cause the bond dissociation to occur.

In some embodiments the energy of dissociation source is a fiber optic cable illuminated at one end by a light source. In some embodiments the light source illuminating the fiber optic cable is a tunable laser. In one embodiment, a photocatalyst is applied to the surface of a fiber optic device and activated from the inside by the specific energy of dissociation. The fiber optic device can be placed into a membrane through which air, solids or liquids flows. In some embodiments the fiber optic device is formed into a mesh placed inside a ballast water treatment system, placed within one or more pipes responsible for the transport of the ballast water between the sea chest and the ballast tanks, place within one or more of the pipes responsible for transporting water between the ballast tanks and the exterior of the ship, placed within the ballast tanks, or placed within a precise energy separation chamber through which the water to be treated must flow. In some embodiments the fiber optic cable is encase within a protective covering, optionally within a quartz tube.

B. Energy of Dissociation Source Intensity

Energy of dissociation source intensity is the quantity of energy supplied to the promoter, which treats a target molecule. Energy of dissociation source intensity is directly proportional to the number and percentage of bonds which can be dissociated. Low intensity energy of dissociation sources have the capability to dissociate a smaller proportion of target bonds compared to higher intensity energy of dissociation sources. For example, in a photonic energy of dissociation source, the greater the number of photons present, the higher the likelihood of ejecting electrons.

In one embodiment, energy of dissociation source intensity is increased by use of a pulse generator in conjunction with a lamp of the proper wavelength, or a tunable laser. In a preferred embodiment, the pulse generator supplies a predetermined number of pulses per second.

C. Energy of Dissociation Source Frequency

The frequency of energy of the energy of dissociation source (in photonic cases, the wavelengths of radiant energy) specifically dissociates target bonds of target compounds. One frequency, multiple selected frequencies, or combinations of energy of dissociation source frequencies can be used depending on the chemical structure of the target material. The apparatus must deliver sufficient intensity of the dissociation energy to completely dissociate the bond in adequate numbers to satisfy the need of the end user.

Methods of determining the appropriate frequency at which a target bond can be dissociated is known in the art, and include resonance enhanced multi-photon ionization (REMPI) spectroscopy, resonance ionization spectroscopy (RIS), photofragment imaging, product imaging, velocity map imaging, three-dimensional ion imaging, centroiding, zero electron kinetic imaging (ZEKE), mass enhanced threshold ionization (MATI), and photo-induced Rydberg ionization (PIRI).

Wavelengths to dissociate hydrogens from ammonia are 193, 214, 222, 234 and 271 nm. Three or more of these wavelengths in combination break $NH_3$ into its components: $N_2$ (g) and $H_2$ (g) without producing ozone. Examples of wavelengths for dissociation include 193 nm and 214 nm, both of which are required. A wavelength of 248 nm will break down Ozone. In a preferred embodiment, the energy of dissociation source frequency range is from 115 nm to 400 nm, with appropriate filters, to satisfy the precise frequency of dissociation energies required for hydrogen dissociation only. Adjustments are made for cage effect and molecular interaction.

In one embodiment, the energy of dissociation source frequency is supplied by a tunable laser or light energy source that subjects samples to a mono-energy.

If the proper dissociation bond energy at a sufficient intensity to dissociate a selected bond or group of bonds is applied, there are no indiscriminate or random molecules or atoms produced other than what will be determined by the selected bonds which are targeted for dissociation, eliminating the random production of undesirable by-products or intermediates seen in oxidation and reduction, microbial or indiscriminate chemical reaction. An electron sink can also be added to the process to insure that there is no recombination or potential for intermediate or by-product production.

D. Catalysts

In one embodiment, the energy of dissociation source includes a catalyst. The catalyst enhances the rate of bond dissociation. The catalyst can be any material of any physical configuration which is compatible with the sample and any other energy of dissociation sources. Catalysts may be unifunctional, multifunctional, or a combination thereof. Catalysts can be used alone or in combination with other catalysts. The catalyst is used to drive the reaction to 100% completion, i.e., dissociating essentially every ammonia molecule into nitrogen and hydrogen. The catalyst is applied to the target molecule or an interface between the energy source and the target molecule wherein the target molecule contacts the catalyst. Catalyst can be applied to a surface (such as a nanoparticle or tube) and submerged or dispersed into the medium to be treated, or the catalyst itself can be dispersed into the medium through which the energy passes to the target molecules.

In a preferred embodiment, an energy of dissociation source includes a photocatalyst and photonic (light-based) energy source. The photocatalyst provides an effective means for converting light into chemical energy. The catalyst or photocatalyst can be a semi-conductive material such as titanium oxides, platinized titania, amorphous manganese oxide, and copper-doped manganese oxide, titanium dioxide, strontium titanate, barium titanate, sodium titanate, cadmium sulfide, zirconium dioxide, and iron oxide. Photocatalysts can also be semiconductors that support a metal, such as platinum, palladium, rhodium, and ruthenium, strontium titanate, amorphous silicon, hydrogenated amorphous silicon, nitrogenated amorphous silicon, polycrystalline silicon, and germanium, and combinations thereof. Catalysts or photocatalysts can be carbon-based graphene or graphite, as well as carbon-doped semi-conductive or other magnetic material, for example, graphene doped AMO.

The data in Example 1 show good activity of Cu-AMO in the photocatalytic degradation of $NH_3$. Some of the parameters to increase activity include enhanced surface area, optimization of $[Cu^{2+}]$, and resultant morphology. The electronic properties of the catalyst may also be important since the AMO is mixed valence ($Mn^{2+}$, $Mn^{3+}$, $Mn^{4+}$) and possible reduction of $Cu^{2+}$ to $Cu^{1+}$. The most active photocatalysts can be analyzed with X-ray photoelectron spectroscopy to study the oxidation state of the copper in these materials. Catalysts are characterized with X-ray powder diffraction (XRD) to study any crystallinity of the materials, electron diffraction (ED) in a transmission electron microscope (TEM) to study both crystalline and amorphous content of the catalyst, and atomic absorption (AA) for compositions of the catalyst. Semi-quantitative analyses of the solid sample can be done by energy dispersive X-ray analyses in a scanning electron microscope (SEM).

IV. Ballast Water Treatment Systems

Systems for water treatment are provided. The systems are well suited for treating ballast water aboard a ship or vessel. The ballast water treatment systems provided can be scaled up or down and can be modified to provide the necessary treatment capacity and rates. In certain embodiments the systems provided are capable of treating more than 1,000 cubic meters of ballast water per hour. In preferred embodiments the ballast water treatment systems provided are capable of treating more than 2,000, more than 4000, more than 6,000, more than 8,000, or more than 10,000 cubic meters of ballast water per hour. In preferred embodiments the ballast water treatment systems provided are capable of treating 1,000-10,000 cubic meters of ballast water per hour, more preferably 4,000-6,000 cubic meters of ballast water per hour.

The ballast water treatment system removes contaminants from ballast water, especially biological contaminants. In certain embodiments the ballast water treatment system discharges less than 20 viable microorganisms per cubic meter. In preferred embodiments the ballast water treatment system discharges less than 15 viable microorganisms per cubic meter, less than 10 viable microorganisms per cubic meter, more preferably less than 5 viable microorganisms per cubic meter, most preferably less than 1 viable microorganism per cubic meter. In certain embodiments the ballast water treatment system discharges less than 10 viable microorganisms having a size greater than 50 microns per cubic meter of discharge, preferably less than 5 viable microorganisms having a size greater than 50 microns per cubic meter of discharge, most preferably less than 1 viable microorganism having a size greater than 50 microns per cubic meter of discharge. In certain embodiments, the ballast water treatment system discharges less than 10 viable microorganisms having a greatest dimension between 10 microns and 50 microns per cubic meter of discharge, more preferably less than 5 viable microorganisms having a greatest dimension between 10 microns and 50 microns per cubic meter of discharge, most preferably less than 1 viable microorganism having a greatest dimension between 10 microns and 50 microns per cubic meter of discharge.

A ballast water treatment system contains one or more Precise Energy Separation (PES) units. Precise Energy Separation units use Precise Energy Separation Technology to dissociate one or more target bonds in the one or more target contaminant molecules in the ballast water.

In certain preferred embodiments, the ballast water treatment system contains 1, 2, 4, or 8 Precise Energy Separation Units. In some preferred embodiments the ballast water treatment system contains only 1 Precise Energy Separation unit. The ballast water treatment system may contain one or more filters to remove larger contaminants, decreasing overall water turbidity and enhancing the effectiveness of the Precise Energy Separation Unit.

In preferred embodiments the ballast water treatment system contains 1, 2, 4, 8 or 10 filters. Filters may be arranged in parallel or in series. The ballast water treatment system may contain one or more sensors, one or more valves, one or more pumps, and one or more switches. In some embodiments, the Precise Energy Separation unit is positioned to treat the water during ballasting as the ballast tanks are being filled. In some embodiments, the Precise Energy Separation unit is positioned to treat the water during de-ballasting as the water is being removed from the ballast tanks. In some embodiments, two Precise Energy Separation units are employed to provide treatment of the water both during ballasting and during de-ballasting. In certain preferred embodiments, a single Precise Energy Separation unit is positioned to be able to treat the water both during ballasting and during de-ballasting.

FIG. 1 provides a schematic of a ballast water treatment system (10) containing a single Precise Energy Separation unit (21) positioned for treating the water both during ballasting and during de-ballasting.

During ballasting the ballasting valves (15) are open and the de-ballasting valves (17) are closed so that water passes from the sea chest (11) through the tubing (13) where it is directed through a filtration unit (19) before passing through the Precise Energy Separation unit (21). The Precise Energy Separation unit treats the water with one or more precise energy separation sources to break the target bonds in the contaminant molecules. The treated water is then stored in the ballast tank (23).

During de-ballasting the ballasting valves (15) are closed and the de-ballasting valves (17) are open. A pump (25) directs water from the ballast tank (23) through the tubing (13) and through the filtration unit (19) before passing through the Precise Energy Separation unit (21). The Precise Energy Separation unit treats the water with one or more precise energy separation sources to break the target bonds in the contaminant molecules. The treated water is then directed through one or more outlets (27) on the exterior of the ship.

Precise Energy Separation Unit

Ballast water treatment systems contain one or more Precise Energy Separation units. In some embodiments a Precise Energy Separation unit is a chamber through which the ballast water passes to be treated. In some embodiments a Precise Energy Separation unit is not a chamber, but is placed in contact with the ballast water. For example, the Precise Energy Separation unit may be a fiber optic cable, a side-emitting fiber optic cable, placed within the ballast system. The Precise Energy Separation unit in some embodiments is placed within the ballast tanks, within one or more pipes responsible for transporting the water from the sea chest to the ballast tanks, within one or more pipes responsible for transporting the water from the ballast tanks to one or more drains on the exterior of the ship, or any combination thereof. A precise energy separation unit contains one or more energy of dissociation sources, optionally containing one or more catalysts, one or more filters, one or more protective coverings, one or more sensors, or any combination thereof.

In certain preferred embodiments the Precise Energy Separation unit is a chamber containing one or more energy of dissociation sources. In some embodiments the Precise Energy Separation chamber contains a single energy of dissociation source. In preferred embodiments the Precise Energy Separation chamber contains a plurality of energy of dissociation sources. The sources are optionally positioned within the interior of the chamber to form an array. In preferred embodiments each of the energy of dissociation sources forming the array is positioned to maximize the distribution of energy throughout the interior of the Precise Energy Separation chamber. The Precise Energy Separation unit in some embodiments contains 1, 2, 3, 5, 6, 7, 8, 9, 10, or 11 energy of dissociation sources.

Figure 2A:
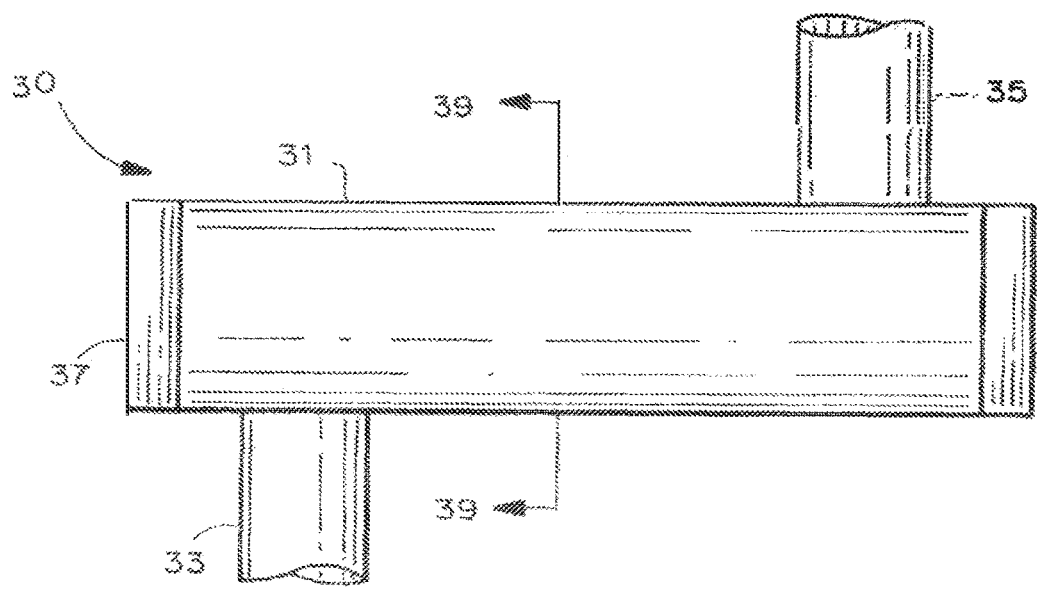
FIG. 2A is a diagrammatic elevation side view of an exemplary precise energy separation chamber. Water to be treated flows into the chamber through an inlet port positioned near a one end, flows through the interior of the chamber and in proximity of one or more energy of dissociation sources, and exits through an outlet port positioned near the opposite end.
Figure 2B:
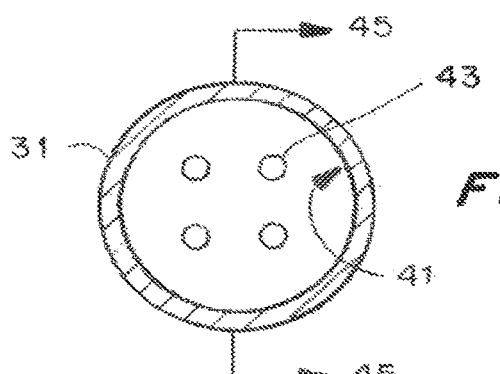
FIG. 2B is a diagrammatic sectional view taken generally along 39-39 in FIG. 2A.
Figure 2C:
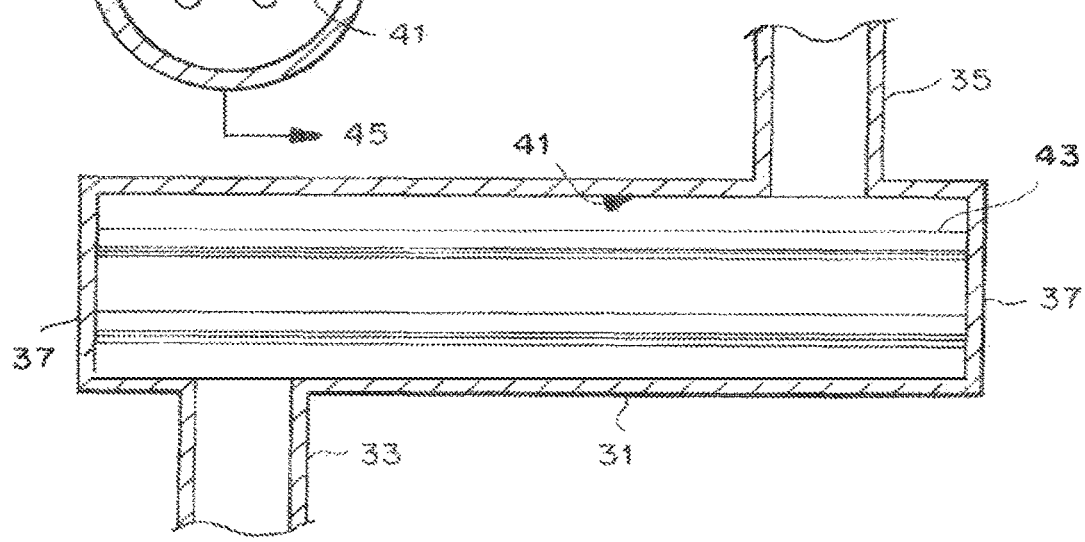
FIG. 2C is a diagrammatic sectional view taken generally along 45-45 in FIG. 2B.

FIGS. 2A-2C depict an exemplary Precise Energy Separation chamber (30). The exterior of the chamber body (31) may be made out of any material that can withstand the harsh conditions aboard the ship. In certain embodiments the chamber body (31) is made from stainless steel, preferably a highly corrosion and deterioration resistant stainless steel or other material. In preferred embodiments, the chamber body (31) is made from stainless steel type 316. In certain embodiments, the chamber body is made from stainless steel containing more than 1% molybdenum, more than 2% molybdenum, more than 3% molybdenum, or more than 5% molybdenum. In certain preferred embodiments, the chamber body (31) is made from stainless steel type 316 having a molybdenum content of 2-3%. The chamber end is sealed with a flange (37). Water passes through the inlet port (33) and into the interior of the chamber body (31). Water containing one or more contaminant molecules having one or more target bonds then passes in the proximity of one or more energy of dissociation sources (43). The exemplary Precise Energy Separation chamber (30) in FIGS. 2A-2C contains four energy of dissociation sources (43). In some embodiments the Precise Energy Separation chamber will contain a greater or fewer number of energy of dissociation sources. For example, in some embodiments the Precise Energy Separation chamber could contain 1, 2, 3, 5, 6, or 7 energy of dissociation sources. Each energy of dissociation source emits a sufficient frequency and intensity of energy, the precise energy of separation, to break the one or more target bonds in the target contaminant molecules and breaking the target molecules into their constituent components. In preferred embodiments, the energy of dissociation source breaks the one or more target bonds in the one or more contaminant molecules without producing any or producing very few by-products. In particular, in preferred embodiments the energy of dissociation source provides a sufficient frequency and intensity of energy to break the one or more target bonds in the one or more contaminant molecules without producing detectable levels of ozone and without requiring deoxygenating the water prior to treatment. The interior surface of the chamber (41) should be able to withstand repeated exposure to the radiation from the energy of dissociation sources, in particular to withstand repeated exposure to UV radiation. In preferred embodiments the interior surface of the chamber (41) will be a reflective or semi-reflective surface. The treated water exits the interior of the chamber through the outlet port (35) and may optionally flow into the ballast tanks during ballasting, be drained outside the exterior of the ship during de-ballasting, or may optionally flow into one or more additional treatment units, ie. filters or additional Precise Energy Separation units.

The Precise Energy Separation chamber contains one or more energy of dissociation sources. The energy of dissociation source may be any energy source capable of providing the precise frequency and intensity of energy required for breaking the one or more target bonds in the target molecules. The energy of dissociation source delivers irradiative energy, catalysis, or combinations thereof. The energy of dissociation source supplies the energy of dissociation with electromagnetic energy, acoustic energy, or any other energy which meets the bond dissociation energy of the target bond. In some embodiments, energy of dissociation sources can be frequency generators, electrical generators, plasma generators, arc lamps, pulse generators, amplifying generators, tunable lasers, ultraviolet lamps, ultraviolet lasers, pulse ultraviolet generators, and ultrasound generators. The energy of dissociation source may be a pulse light source, for example allowing use a 10 watt input of energy to generate 400,000 watts of pulse energy within ⅓ of a second of output, thereby reducing energy usage and equipment size and cost.

In preferred embodiments, the energy of dissociation source is a pulse tunable laser or diode attached to a pulse generator. In one embodiment, the energy of dissociation source is a fiber optic device, optionally containing a photocatalyst coating. In preferred embodiments, the energy of dissociation source is a pulsed light source, optionally contained within a protective cover and optionally in combination with one or more filters or one or more catalysts. In particularly preferred embodiments the energy of dissociation source contains one or more Xenon flash tubes housed within a protective Quartz tube cover. In preferred embodiments the interior or the exterior of the protective cover is coated with a band pass coating or other filter material that effectively blocks transmission of certain wavelengths. In preferred embodiment the interior or exterior surface of the protective cover is coated with a band pass coating that prevents transmission of all wavelengths that lead to the production of unwanted by products, thereby the energy of dissociation source provides only the précise frequencies of energy to dissociate the target bonds. In certain embodiments the energy of dissociation source is capable of emitting more than 0.5 $W/cm^2$ per second of water flow, greater than 0.8 $W/cm^2$ per second of water flow. In preferred embodiments, the energy of dissociation source is capable of emitting more than 1.0 $W/cm^2$ per second of water flow, more preferably greater than 1.5 $W/cm^2$ per second of water flow.

FIGS. 3A-3D depict an exemplary Precise Energy Separation chamber (50). The exterior of the chamber body (51) may be made out of any material that can withstand the harsh conditions aboard the ship. In certain embodiments the chamber body is stainless steel. Water passes through the inlet port (53) and into the interior of the chamber body. A plurality of energy of dissociation sources (68) traverses the length of the interior of the chamber. Each of the energy of dissociation sources includes one or more U-shaped Xenon flash bulb (71) housed within a protective Quartz tube (69). The base of each Xenon flash bulb (77) is attached via an electrically conductive means (79) to a power source. In preferred embodiments the base of each Xenon flash bulb is independently addressable. In certain embodiments, although more bulbs may be present, only a single flash bulb is used in each energy of dissociation source at a time. The second flash bulb provides a backup that is powered on in case of bulb failure. In certain embodiments, a controller may optionally power both bulbs in the energy of dissociation source, for instance when high intensities are required due to higher than normal water turbidity.

To prevent overheating of the device, a cooling gas (ie. $N_2$) flows over the bulbs. The cooling gas enters an exterior chamber through the cooling gas inlet port (57), flows over the flash bulbs through the interior of the Quartz tubes, and exits through the cooling gas exit port (59). Water containing one or more contaminant molecules having one or more target bonds passes in the proximity of one or more of the energy of dissociation sources (68).

The energy of dissociation source emits a sufficient frequency and intensity of energy, the precise energy of separation, to break the one or more target bonds in the target contaminant molecules dissociating the target molecules into their constituent components. In preferred embodiments, the energy of dissociation source breaks the one or more target bonds in the one or more contaminant molecules without producing any or producing very few by-products. In particular, in preferred embodiments, the energy of dissociation source provides a sufficient frequency and intensity of energy to break the one or more target bonds in the one or more contaminant molecules without producing detectable levels of ozone and without requiring deoxygenating the water prior to treatment. The treated water exits the interior of the chamber through the outlet port (55) and may optionally flow into the ballast tanks during ballasting, be drained outside the exterior of the ship during de-ballasting, or may optionally flow into one or more additional treatment units, ie. filters or additional Precise Energy Separation units.

In some embodiments the outside dimension of the U-shaped bulb is 3 inches, therefore the inside of the protective quartz sleeve must be at least 3.25 inches and the sleeve itself will be inch thick, making the overall size at least 3.75 inches. The protective sleeve may have cleaning wipers that will be able to easily move back and forth to keep the sleeves clean.

The Precise Energy Separation unit is capable of treating water of varying water qualities. A particular advantage of Precise Energy Separation is the ability to adjust the frequencies and/or the intensities of the energy of dissociation sources in order to treat water with high turbidity. In some embodiments a Precise Energy Separation unit is capable of treating ballast water having turbidity greater than 5 NTU, greater than 10 NTU, preferably greater than 25 NTU, greater than 50 NTU, more preferably greater than 100 NTU, even more preferably greater than 500 NTU, most preferably greater than 1,000 NTU.

Several parameters determine the overall capacity of a Precise Energy Separation unit for treating ballast water. They include, but are not limited to, the intensity of light from the energy of dissociation source, the pulse frequency and pulse duration of a pulsed light source, the overall flow rate, and the minimum amount of time particles spend within the interior of the chamber. In certain embodiments the energy of dissociation source will pulse at a frequency of at least 1 Hz, at least 2 Hz, at least 3 Hz, at least 5 Hz, or at least 10 Hz. The pulse duration of the energy of dissociation source will in some cases be less than 2,000 microseconds, preferably less than 1,000 microseconds, more preferably less than 500 microseconds, most preferably less than or equal to 100 microseconds. The size and dimensions of the chamber, the placement of the inlet and outlet ports, and the placement of the energy of dissociation sources in the interior of the chamber will all impact the minimum amount of time a particle spends within the interior of the chamber. In some embodiments the minimum time a particle spends in the interior of the chamber is greater than 0.1 seconds, greater than 0.25 seconds, greater than 0.5 seconds, or greater than 1 seconds.

Figure 4A:
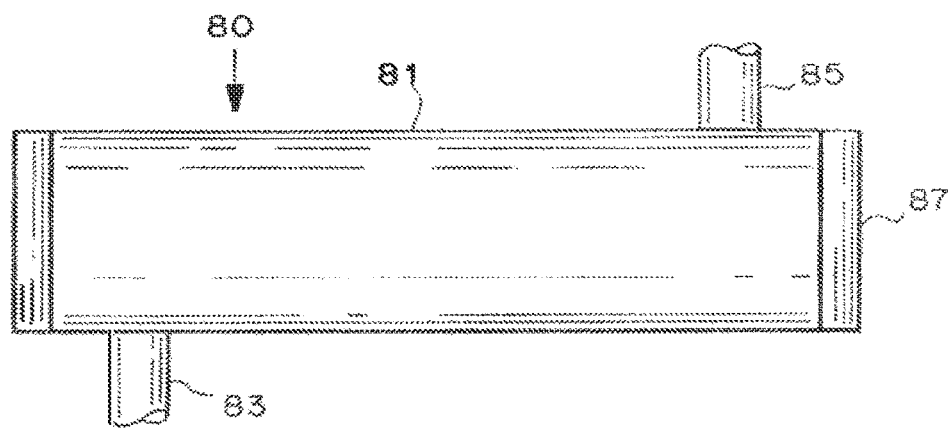
FIG. 4A is a diagrammatic elevation view of an exemplary precise energy separation chamber. Water to be treated flows into the chamber through an inlet port positioned near one end, flows through the interior of the chamber and in the proximity of a plurality of energy of dissociation sources, and exits through an outlet port positioned near the opposite end.
Figure 4B:
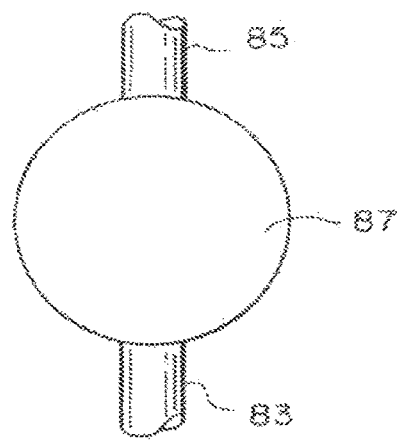
FIG. 4B is a diagrammatic plan view of the exemplary precise energy separation chamber from FIG. 4A.
Figure 5A:
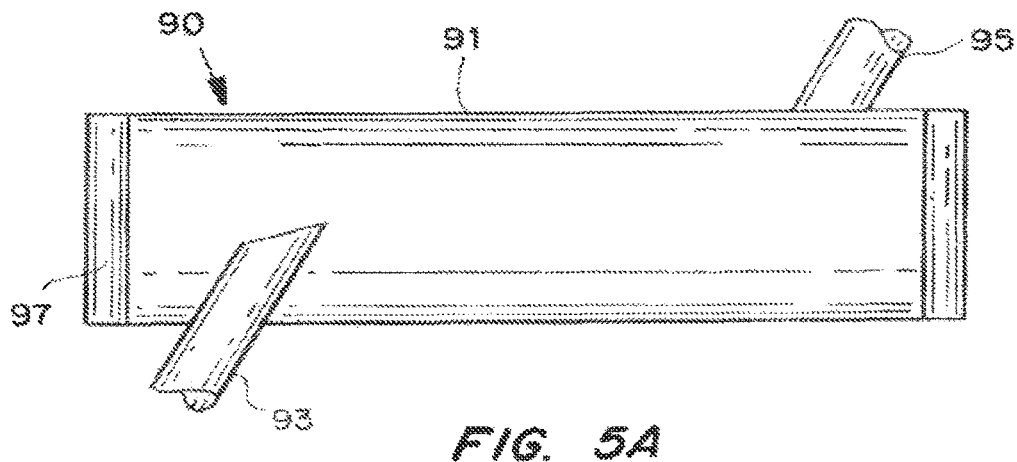
FIG. 5A is a diagrammatic elevation view of an exemplary precise energy separation chamber. Water to be treated flows into the chamber through an inlet port positioned near one end, flows through the interior of the chamber and in the proximity of a plurality of energy of dissociation sources, and exits through an outlet port positioned near the opposite end.
Figure 5B:
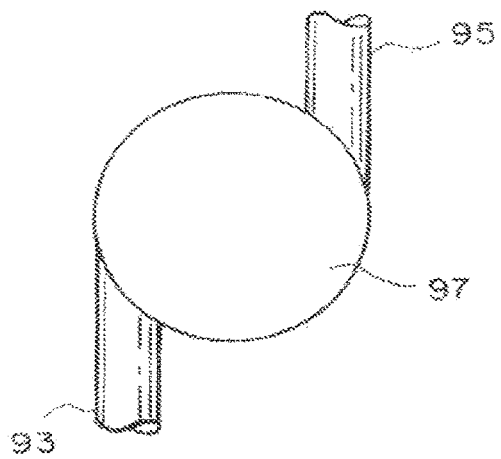
FIG. 5B is a diagrammatic plan view of the exemplary precise energy separation chamber from FIG. 5A.
Figure 6A:
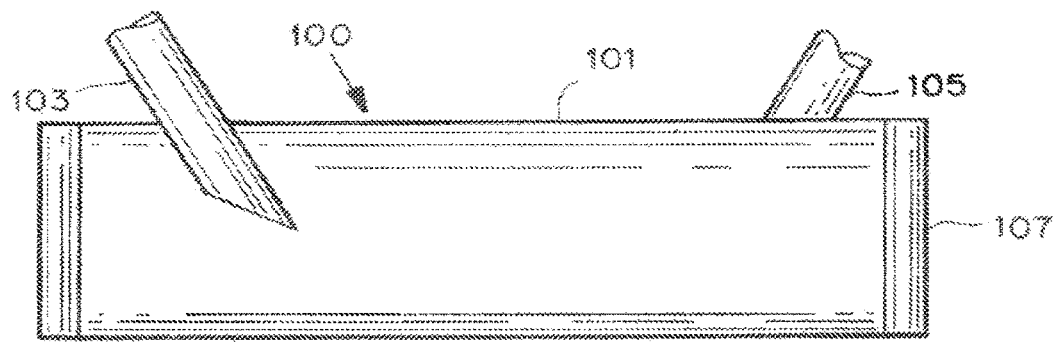
FIG. 6A is a diagrammatic elevation view of an exemplary precise energy separation chamber. Water to be treated flows into the chamber through an inlet port positioned near one end, flows through the interior of the chamber and in the proximity of a plurality of energy of dissociation sources, and exits through an outlet port positioned near the opposite end.
Figure 6B:
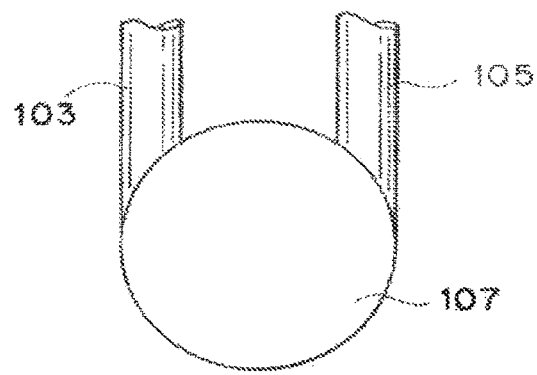
FIG. 6B is a diagrammatic plan view of the exemplary precise energy separation chamber from FIG. 6A.

FIGS. 4A-4B, 5A-5B, and 6A-61B depict schematics of exemplary Precise Energy Separation chambers having different configurations of the inlet (93) and outlet (95) ports. FIGS. 4A, 5A, and 6A (4B, 5B, and 6B) depict a side elevation (end pan) view of the Precise Energy Separation chamber.

The arrangement of the inlet and outlet ports will impact the patterns of flow and the minimum time a particle spends within the chamber. FIGS. 4A and 4B depict a configuration where the inlet (93) and outlet (95) ports are arranged perpendicular to the exterior surface normal of the chamber body, positioned in a co-planar arrangement and on opposite ends of the chamber. FIGS. 5A-5B and 6A-6B depict configurations where the inlet (93) and outlet (95) ports are angled to direct flow along the long axis of the chamber.

If the overall unit is constructed from a material such as CPVC, which is stable and inert in a marine environment, a reflective lining or coating in the Precise Energy Separation chamber is required to protect the CPVC from the light. The UV light will break down the CPVC. Suitable materials are available from Acree Technologies Incorporated, which specializes in reflective coatings that are saltwater-, high corrosive-, and abrasion-resistant.

Directional flaps on the outlet side of the Cross filters insure that the flow of water into the Precise Energy Separation chamber will follow a circular pattern. This way, the water keeps swirling around (turbulent flow) to ensure that all of the water is treated by the light.

The most important parameter in UV system design is UV dose (UV intensity×exposure time), measured in mW/cm2—or in microW/cm$^2$ (1 mW/cm$^2$=1,000 microW/cm). Therefore, the exposure or residence time has to be included as well as the lamp output being considered. Most important is UV transmittance (or absorbance). This is a measurement in a 1-cm path length cell of how much UV light is transmitted (or absorbed) by matter dissolved or suspended in the water. Distilled water is 100% and wastewater, dependent on treatment quality, can range from 20% to 80%. The more UV absorbed, the lower the flow treated per lamp. Table 1 gives some approximate capacities per lamp at various water qualities to achieve <200 fecal coliforms per 100 ml.

TABLE 1

Approximate capacities per lamp at various water qualities to achieve <200 fecal conforms per 100 ml.

| Water quality BOD/SS (mg/L) | % UV Transmission (1 cm) | Flow per lamp (L/s) |
|---|---|---|
| 30-30 | 40 | 0.5-0.75 |
| 20-20 | 50 | 0.75-1.2 |
| 10-10 | 65 | 1-1.4 |

Each quartz sleeve may be coated on the inside with a band gap filter coating that will permit only 254-nm light to pass through. The ends of the quartz sleeve are attached to a pulse generator, similar to how a fluorescent light bulb is attached to its ballast. Applied Energetics sells a pulse generator that will activate 8-10 pulse bulbs Bulbs are preferably set to 3 pulses/second. The Xenon bulbs in some embodiments provide a range in the UV (185-280 nm). The internal coating will ensure that only 254-nm light is generated, which will break down the DNA/RNA in any living organisms (usually they will die outright, but even if they survive, they will no longer be able to reproduce). Emitting only 254-nm light prevents the formation of any byproducts, or at least will prevent the formation of detectable amounts of byproducts.

The power generators for the light arrays may be positioned outside the Precise Energy Separation chamber, near the shut-off valves. The quartz sleeves are in some embodiments no more than 4 inches apart, to protect against any light intensity loss due to turbidity. The water moving through the Precise Energy Separation chamber helps to dissipate the heat produced by the bulbs. Cooled nitrogen gas may in some embodiments be constantly circulating inside the quartz sleeves that house the bulbs. The nitrogen flows into and out of each quartz sleeve to a central cooling chamber located outside of each sleeve. The nitrogen gas is cooled via a mini-heat exchanger and then returned to the sleeve. Aside from cooling, the nitrogen gas prevents formation of any oxidation products. The system typically has a small circulation pump to circulate the nitrogen gas.

The quartz sleeves will in some embodiments be cleanable with an automatic squeegee system and easily removed for maintenance.

In addition, the appropriate sensors may to be installed to verify the proper light intensity is being applied Filtration Units The ballast water treatment system will usually contain one or more filtration units. The filtration unit removes large particulate matter and improves the efficiency of the Precise Energy Separation unit by decreasing the overall water turbidity. The filtration unit in some embodiments removes large particles of clay, silt, sand, organic or inorganic matter. In some instances filtration units remove smaller particles, plankton, and some microorganisms. In preferred embodiments, the filtration unit removes all particulates greater than 30 microns, more preferably greater than 25 microns, greater than 20 microns, or greater than 15 microns.

In preferred embodiments a filtration unit is positioned in line before the Precise Energy Separation unit. In some embodiments the filtration unit filters all particulate matter having a smallest dimension greater than 100 µm, preferably greater than 50 µm, more preferably greater than 30 µm. In some embodiments the filtration unit decreases overall water turbidity to less than 500 NTU, preferably less than 100 NTU, more preferably less than 50 NTU, most preferably less than 10 NTU. In some embodiments a filtration unit reduces overall water turbidity by 10%, preferably 25%, more preferably 50%. In some embodiments the filtration unit contains a plurality of filters that may be arranged in series or in parallel to optimize performance of the filtration unit. For example, the filtration unit may contain 2, 3, 4, 5, or 6 filters arranged in series to increase the overall filtration capacity. The filtration unit will optionally contain a quick-release hatch so that it can be readily accessed for servicing, as well as easily installed. In preferred embodiments the filters are 50 micron filters, more preferably 30-micron or 25-micron filters. These filters are designed to be cleaned by both pulsing and backwashing. In certain embodiments the filtration unit contains a pre-filter that removes the largest matter before entering the smaller 25-30 micron filters, or in some embodiments before entering an equivalent centrifuge or vortex filter.

The filtration unit may contain a pump that periodically pulses the filters to remove buildup. Water will still be in the filtration unit, but the flow will stop momentarily when the spring pulse occurs. The filters will have a differential switch set at a minimal pressure, for example, 10 psi, just to dislodge material on the filter so the filter can continue to function. Only about 10 gallons of disinfection water is required back through each filter in a short burst to dislodge the particulates on the filters. This could be done using a small centrifugal pump or a pressure valve system. A check valve is needed at the inlet for the pulse water pump. In the spring pulse cleaning, the spring filters will be separated by extending the spring and a backwash pulse will provide a short, minimal water exchange with filtered water from the Precise Energy Separation chamber to remove material on the spring filters. During a pulse, the detritus in the filter is dislodged, and then re-attaches to the outside of the cross flow filter. In theory, this process makes new, clean (i.e., unobstructed) areas available on the Cross filter, so that the filter can remove additional detritus from the ballast water.

When the filters in the filtration unit contain significant buildup or detritus they may be changed or they may be cleaned via backwashing. This can be detected, for instance, when a timing sensor detects that the frequency of cleaning with the pulse pump is too frequent (ie. greater than once per minute) or when the pressure differential between the filtration unit and the Precise Energy Separation unit is too large (ie, there is a 25 psi pressure drop across the filtration unit). In the backwash cleaning cycle, the water flow through the filter and the Precise Energy Separation chambers stop, and the entire volume of water with all of the suspended debris in the filtration chamber drains through a single high flow automatic cleaning strainer such as the Eaton MCS-500 or MCS-1500 models. The strained water returns to the inlet side of the filtration chamber. The collected 50-micron and larger debris is disposed of as solid waste. The spring filter units are cleaned by a backwash pulse. Material will also be drained through the Eaton high flow automatic cleaning strainer. Then the flow of water from the ballast tank begins again. During, or before, the refill, the filters reset to their original position, and the filter chamber process goes back on-line again. The entire drain/backwash/restart process takes only a few minutes, and cleans detritus off the entire outside surface area of the cross filters, so that the pressure differential between the filtration and Precise Energy Separation units returns to zero. The filter/disinfectant units are programmed to support both the spring pulse and the full backwash cleaning. A preferred method of filtration is a liquid-solid liquid centrifuge or vortex process, which removes sand or silt in the ballast water. In some embodiments, the liquid-solid liquid centrifuge or vortex process removes particulates larger than 30 micron. In some embodiments, the liquid-solid liquid centrifuge or vortex process further removes light liquids such as oils or hydrocarbons.

Sensors, Switches, and Valves

A ballast water treatment system will contain a variety of sensors, switches, and valves. Sensors, switches, and valves are used to control water flow and exposure to the treatment to destroy contaminants. For example, a level switch closes the valve from the ballast water holding tank to the filtration chamber and from the filtration chamber to the Precise Energy Separation chamber during the cleaning and opens the valve to the untreated ballast water supply and to the Precise Energy Separation chamber to re-start the flow through the system as soon as the filtration chamber has been emptied. Either check valves or automated activation valves are used to coordinate this entire process.

A variety of sensors can be employed in a ballast water treatment system. Exemplary sensors include pressure sensors, i.e. for measuring water pressure inside a chamber or differential pressure of water entering and leaving a component; light sensors for measuring light intensity; water level sensors, nephelometers for measuring turbidity, and sensors for measuring the activity of catalysts beds that may be used.

A sensor in some embodiments is used to detect the water level in the Precise Energy Separation chamber and to turn off the power if the water level drops below a certain height. The sensor/power cutoff switch can be placed at the highest vertical point above the topmost energy of dissociation source in the array inside the chamber, so that if the water level within either chamber drops, the power will be immediately turned off.

A pressure detection switch is used in some embodiments in the filtration unit, in the Precise Energy Separation Unit, or in both units, so that the system can monitor pressure within the chambers or, when pressure sensors are employed in both, monitor the differential in water flow (psi) between the two chambers.

In addition, one or more UV sensors may be placed inside a Precise Energy Separation chamber, or if the Precise Energy Separation unit is not a chamber may be placed in proximity of the unit to detect whether the energy of dissociation sources are producing the needed intensity to provide the desired kill rate, preferably 1 W/cm$^2$ per second of water flow. In some embodiments the energy of dissociation sources produce an intensity greater than 0.5 W/cm$^2$ per second of water flow, more preferably greater than 1 W/cm$^2$ per second of water flow. In some embodiments the energy of dissociation sources produces an intensity greater than 1.5 W/cm² per second of water flow.

Shut-off valves can be used throughout the ballast water treatment system. For example, in some embodiments, the Precise Energy Separation chamber has two shut-off valves. The filtration unit may have check valves for the Cross filter to stop the flow of water from the Cross filter into the Precise Energy Separation chamber. Typical ballast water treatment systems will have valves leading from the Precise Energy Separation unit to discharge pipe that leads to the ship's exterior, as well as between the sea chest and the ballast tanks or the filtration units, to regulate the water flow.

A valve system is required to shut off the water for servicing. A water level switch that is connected to a sensor that detects the water level above the topmost bulb in the array in the Precise Energy Separation chamber is also required. The sensor/power cutoff switch should be placed in the chamber wall at the highest vertical point inside the Precise Energy Separation chamber, so that if the water level within the Precise Energy Separation chamber drops at all, the power will be immediately turned off. The system includes a pressure detection switch.

The valves that may be utilized include:

A shut-off valve to stop the flow of water before the ballast water even enters the unit. This valve will shut off the water for the backwash cleaning cycle and for servicing the unit.

A check valve for each cross filter to stop the flow of water from the cross filters in the filtration chamber into the Precise Energy Separation chamber.

A check valve at the inlet for the pulse water pump in the filtration chamber.

A valve at the drain from the filtration chamber to the Eaton high flow automatic cleaning strainer A shut-off valve to stop the flow of water from the Precise Energy Separation chamber (i.e., leaving the unit) to the discharge pipe that leads to the ship's exterior.

A valve at the drain where we backwash the system.

A check valve at the inlet for the pulse water pump.

A valve from the filtration chamber to the Precise Energy Separation chamber.

A sensor detects the water level in the filtration chamber. The sensor should be placed at the highest vertical point inside the chamber. A pressure detection switch is used in both the filtration and the Precise Energy Separation chambers, so that the system can monitor the differential in water flow (psi) between the two chambers.

The Precise Energy Separation chamber may have two shut-off valves.

A check valve for each Cross filter to stop the flow of water from the Cross filters in the filtration chamber into the Precise Energy Separation chamber.

A valve from the Precise Energy Separation chamber to the discharge pipe that leads to the ship's exterior.

Power Generator Placement

In one embodiment, the power generator is placed on the side of the unit, by the shut-off valve for the water supply.

V. Methods of Use

A specific frequency of light at the proper intensity when applied to molecules, optionally in the presence of a catalytic or similar promoter, will dissociate any selected bond, resulting in the destruction or inactivation of the target molecule through atomic dissociation of the molecule. Accordingly, this method can be used to eliminate or inactivate biological contaminants, chemical contaminants, or combination thereof in a sample. The component product gases, elements or chemicals can be purified, stored, utilized or disposed of.

In some embodiments, water comprising target molecules is subjected to dissociation with an energy of dissociation to eliminate or inactivate one or more biological contaminants, chemical contaminants, or combination thereof. In preferred embodiments, the method effectively eliminates chemical pollutants, biological contaminants, and combinations thereof in a contaminated water sample without generating intermediates or byproducts which require further remediation. The method can further include purification, for example, to remove the resultant component products or remove catalyst, if present. In certain embodiments, a sample containing one or more biological contaminants is sterilized using the method described herein.

Ballast water containing one or more chemical contaminants, biological contaminants, or combinations thereof is irradiated with energy at a frequency and intensity in an amount effective to selectively break one or more bonds within one or more target molecules. In doing so, one or more chemical contaminants, biological contaminants, or combinations thereof present in the ballast water are eliminated or otherwise rendered environmentally benign.

In certain embodiments, the ballast water is irradiated at the time of loading, during storage or during discharge. Preferably, the energy source for ballast water irradiation is incorporated into the means for ballast water discharge, such that ballast water treatment operates interruption-free with a high volumetric flow rate of water. In certain embodiments, the ballast water treatment operates interruption-free with a volumetric flow rate of greater than 1,000 cubic meters per hour, more preferably greater than 2,500 cubic meters per hour, more preferably greater than 4,000 cubic meters per hour, more preferably greater than 5,000 cubic meters per hour, or most preferably greater than 6,000 cubic meters per hour.

In certain embodiments, the method effectively eliminates chemical pollutants and biological contaminants in ballast water without generating intermediates or byproducts which require further remediation and/or without requiring the addition of chemical reagents.

Duration of the Process

The process typically is conducted until the majority of all target molecules have been dissociated into component products. Examples of duration of time include from a fraction of a second to 10 minutes. In a preferred embodiment, the process is conducted for one minute, two minutes, three minutes, four minutes, five minutes, or greater.

Those skilled in the art will recognize the energy of dissociation source intensity, concentration of sample, and energy of dissociation source energy required will affect the amount of time required for complete dissociation.

System Advantages

Precise Energy Separation (PES) Technology involves exposing a target pollutant to a burst of specific high intensity energy in order to dissociate it at a molecular level. The system has a low energy input yet produces a high selective energy output. The PES System produces no toxic byproducts, and allows for the dissociation of harmful hydrocarbons or other chemicals identified and regulated in the future, in addition to invasive species.

PES is able to provide deeper penetration to the pollutants than other technologies and can attain up to 100% exposure and at least a 2, 3, 4, 5, 6, 7, 8, or 9 log kill rate of invasive organisms after one second. PES can eliminate virus which need an exposure of 440,000 µws/cm² to be killed. The technology is effective in turbid or chemical waters and waters with suspended particles that house small viruses or microorganisms. Existing UV systems cannot resolve these issues because the contaminants in water reduce the transmission of UV light through the water, therefore the destructive rays of UV light does not reach the organisms.

PES systems consume up to 80% less energy than continuous wave mercury UV systems. Short, high energy bursts result in significantly less energy usage compared to the continuous mercury UV cycle. Additionally, PES selects only the wavelength which is needed to kill the undesirable organism, thereby not producing unintended byproducts, or unknown photochemical reaction end products, such as oxidants or reducing chemicals as is seen with electrochlorination systems, which can be more harmful than the original organism or chemical.

The PES system allows engineers to tailor or 'tune' key parameters to the application, including changing the peak power, pulse repetition rate, pulse sequencing, exposure duration, and wavelength or wavelengths (output energy). This unique flexibility helps process engineers, integrators and formulators find the optimal balance between high energy, low heat, short exposure times, flow rates and absolute kill rates.

PES delivers high intensity bursts of energy in less than a second which results in higher throughputs for volume of treatment. This minimal exposure time permits a much higher throughput volume, and allows for a smaller inline, cost effective unit for the treatment of larger volumes, e.g., up to 5,000 m$^3$/h. PES can achieve large flow rates with a single unit, allowing costs to scale much better than the current systems of modular systems which increase scalability simply by adding units.

In one embodiment, the PES system uses xenon gas, which eliminates the threat of contamination of the water due to leakage of the mercury gas used in standard UV systems. PES selects only 254 nm light which will disrupt the DNA of invasive species, thereby creating no oxidizing agents or harmful byproducts such as is found in current proposed systems. PES does not generate potentially dangerous microwaves, nor does it contain mercury.

There are two major cost considerations when choosing a treatment system—capital expenditure and operational expenditure. The estimated capital expenditures of PES are competitive to alternative treatment systems. The operational expenditures (primarily derived from the cost of energy) are very far below the mean for treatment options. It is estimated that the average energy usage for BWT systems is 68 kw per 1000 m$^3$ of processed water with an operating cost of $39 per 1000 m$^3$/hr. By comparison, the energy usage and operating costs for PES are estimated at 13.5 kw per 1000 m$^3$ and $8 per 1000 m$^3$/hr, respectively.

Certain treatment options have a range of acceptable temperature ranges in which they are effective. For example, electrolytic disinfection, also known as electro-chlorination, cannot function below 5° C. or 41° F. This makes it impractical for use on ships which must transport cargo in cold climates (or even temperate climates in winter). The PES System can operate equally effectively at any temperature which a vessel may encounter on the surface of the Earth.

The present invention will be further understood by reference to the following example.

Example 1: Photocatalytic Generation of $N_2$ from $NH_3$

A pulse of light of a particular frequency and intensity of a quick duration (nano or pico-second burst or similar duration providing a multi-photon discharge) is used to photodissociate ammonia to nitrogen and hydrogen with no production of any intermediates or oxidized by-products such as nitrate, nitrite or nitrous oxide. This is accomplished by the use of the correct promoter, light frequency energy and/or specific input of the correct bond dissociation energy or energies for ammonia with a proper intensity which provides for a multiphoton or frequency energy exposure of the ammonia molecule. A particular molecular bond having a precise energy of bond or dissociation in each target molecule is broken by photo-dissociation, only due to the light pulse being at the proper frequency and intensity with the proper number of photons attached within the necessary time to prevent reconnection, thereby producing harmless nitrogen and hydrogen, thereby removing the harmful ammonia from the water. A benefit of this process is that the off gases or cleaved atoms can be collected and used as energy sources as is in the situation with hydrogen in a fuel cell or hydride engine or as a nutrient.

Materials and Methods

A three ounce solution of 1 ppm ammonia in water was irradiated with a xenon curing bulb attached to a pulse generator which supplied 3 pulses per second. Optionally, one of the following catalysts were included: Pt/TiO$_2$ (platinized titania), TiO$_2$ (Titanium oxide), Cu-AMO (Copper-doped Amorphous Manganese Oxide, AMO (Amorphous Manganese Oxide), and Cu—Ce—Co (Copper-Cerium-Cobalt). The xenon curing bulb was set to the low ultraviolet range from 185 nm to 280 nm. The solutions were tested for component gases after one second and one minute. The resultant gases of dissociation, N$_2$ (g) and H$_2$ (g), were measured by gas chromatography (GC), mass spectrometry (MS), ion chromatography, and gas chromatography-mass spectrometry (GC-MS) methods. Separation and determination of ammonia (NH$_3$), nitrite (NO$_2^-$) and nitrate (NO$_3^-$) in single sample solutions was performed as follows:

NH$_4^+$ was converted to NH$_3$ in solution using NaOH.

NH$_3$ was reduced to NO$_2^-$ using FeSO$_4$.

NO$_2$ was oxidized to NO$_3^-$ using Al—Cu—Zn (Devarda's alloy)

Results

Preliminary results for the degradation of ammonia in water are shown below in Tables 2-4. The products were analyzed by gas chromatography (GC), mass spectrometry (MS), ion chromatography, and gas chromatography-mass spectrometry (GC-MS) methods.

TABLE 2

Generation of N$_2$ from NH$_3$ via Photocatalysis

| Sample | Trial | O$_2$ peak area | N$_2$ peak area | Total Peak Area | N$_2$ Peak Ratio[a] | Peak Ratio[b] |
|---|---|---|---|---|---|---|
| 100% N$_2$ | 1 | 0 | 1557.491 | 1557.491 | 1.00 | 0 |
| | 2 | 2.3732 | 1557.4989 | 1601.3 | 0.972 | 656.286 |
| Air | 1 | 149.2122 | 609.9426 | 759.1548 | 0.803 | 4.087 |
| | 2 | 58.9228 | 236.4986 | 295.4214 | 0.800 | 4.013 |
| Blank[c] | 1 | 9.0868 | 32.8381 | 41.9249 | 0.783 | 3.613 |
| | 2 | 2.9284 | 9.2394 | 12.1678 | 0.759 | 3.150 |

TABLE 2-continued

Generation of $N_2$ from $NH_3$ via Photocatalysis

| Sample | Trial | $O_2$ peak area | $N_2$ peak area | Total Peak Area | $N_2$ Peak Ratio[a] | Peak Ratio[b] |
|---|---|---|---|---|---|---|
| Platinized $TiO_2$ | Day 1 | 115.4792 | 552 | 679.3385 | 0.813 | 4.782 |
| | Day 2, Trial 1 | 5.0618 | 23.9787 | 39.1785 | 0.612 | 4.737 |
| | Day 2, Trial 2 | 5.5956 | 25.2047 | 30.8003 | 0.818 | 4.504 |

[a]$N_2$ Peak Ratio = ($N_2$ Peak Area/Total Peak Area)
[b]Peak Ratio = ($N_2$ Peak Area/$O_2$ Peak Area)
[c]$O_2$ and $N_2$ peaks observed are attributed to sample contamination with air due to the limitation of manual injection despite precautions. Online injection avoids this contamination.
Trial 1 = 1 second; Trial 2 = 1 minute

TABLE 3

Photocatalytic Data for Various Photocatalysts[a]

| Catalyst | Trial | $NH_3$ | $NO_2^-$ | $NO_3^-$ |
|---|---|---|---|---|
| Platinized $TiO_2$ | 1 | 0.0574 | 0.0125 | 0.0137 |
| | 2 | 0.0574 | 0.0123 | 0.0135 |
| | 3 | 0.0572 | 0.0122 | 0.0134 |
| | Average | 0.0573 | 0.0123 | 0.0135 |
| $TiO_2$ | 1 | 0.1547 | 0.0101 | 0 |
| | 2 | 0.1548 | 0.0106 | 0 |
| | 3 | 0.1550 | 0.0108 | 0 |
| | Average | 0.1548 | 0.0105 | 0 |
| Cu—AMO | 1 | 0.1322 | 0 | 0 |
| | 2 | 0.132 | 0 | 0 |
| | 3 | 0.1318 | 0 | 0 |
| | Average | 0.132 | 0 | 0 |
| AMO | 1 | 0.736 | 0 | 0 |
| | 2 | 0.7358 | 0 | 0 |
| | 3 | 0.7356 | 0 | 0 |
| | Average | 0.7358 | 0 | 0 |
| Co—Ce—Cu | 1 | 0.3926 | 0 | 0 |
| | 2 | 0.3924 | 0 | 0 |
| | 3 | 0.3922 | 0 | 0 |
| | Average | 0.3924 | 0 | 0 |

[a]Units are in Absorbance Units

TABLE 4

$NH_3$ Concentrations following Photocatalysis with Various Catalysts

| Catalyst | Average Calculated $NH_3$ Concentration Following Photocatalysis (mM) | Percent Decrease from Starting $NH_3$ Concentration (%) |
|---|---|---|
| None | 0.19 | 0 |
| Platinized Titania | 0.029 | 84.6 |
| $TiO_2$ | 0.080 | 57.5 |
| Cu—AMO | 0.068 | 63.9 |
| AMO | 0.388 | −104.2 |
| Co—Ce—Cu | 0.206 | −8.93 |

Discussion

From Tables 2-4, a significant decrease in $NH_3$ concentration in $Pt/TiO_2$ from 0.1 mM to 0.029 mM is observed. This is an indication of the conversion of ammonia to other nitrogen-containing species. The photocatalytic activity of AMO is impressive. However, the data clearly indicate photocatalytic oxidation of $NH_3$ in aqueous solution to the undesirable toxic nitrate and nitrite oxygenated products. Doping the AMO with copper ($Cu^{2+}$ ions) markedly increased the selectivity for 100% conversion of ammonia to nitrogen gas.

We claim:

1. A system for fluid remediation comprising:
a chamber having an interior and an exterior, one or more inlet ports, and one or more outlet ports,
one or more energy of dissociation sources coupled to a pulse generator, and
one or more fluid treatment units coupled to the one or more inlet ports of the chamber,
wherein the system is configured so that fluid is capable of flowing into the chamber through the one or more inlet ports, through the one or more fluid treatment units proximate to the one or more energy of dissociation sources for treatment of the fluid, and out of the chamber through the one or more outlet ports,
wherein the one or more energy of dissociation sources is configured to provide one or more pulses of energy in an effective amount, intensity, pulse frequency, and pulse duration to dissociate one or more target bonds in one or more target molecules present in the fluid to dissociate the one or more target molecules into component products comprising ions or atoms of elements found within the one or more target molecules with a chemical formula distinct from the one or more target molecules, and
wherein the one or more energy of dissociation sources comprises:
a protective tube, and
one or more flash tubes disposed within an interior of the protective tube,
wherein the one or more energy of dissociation sources comprises at least one optical filter disposed to filter selected wavelengths of light produced by the one or more flash tubes to suppress production of one or more unwanted byproducts.

2. The system of claim 1, wherein said one or more flash tubes comprises a U-shaped flash tube.

3. The system of claim 2, wherein said fluid comprises water, and wherein said one or more fluid treatment units comprise one or more water treatment units.

4. The system of claim 1, wherein at least one tube of the one or more energy of dissociation sources comprises filter material of the at least one optical filter.

5. The system of claim 1, wherein the protective tube comprises a quartz sleeve,
wherein the at least one optical filter is operable to permit transmission of ultraviolet light in a selected wavelength range and to block transmission of ultraviolet light outside the selected wavelength range, and
wherein the selected wavelength range comprises 254 nanometers.

6. The system of claim 1, wherein the one or more flash tubes comprises a xenon flash tube that is operable to produce ultraviolet light in a wavelength range of 185 to 280 nanometers, and
wherein the at least one optical filter is operable to permit transmission of 254-nm light and to block second light, said second light having a wavelength in the wavelength range other than 254 nanometers.

7. The system of claim 1, wherein the one or more energy of dissociation sources are arranged to distribute the energy as ultraviolet light throughout the interior of the chamber, and
wherein the chamber comprises a reflective lining.

8. The system of claim 1, wherein the at least one optical filter is operable to limit emission of light from the one or more energy of dissociation sources to a selected wavelength band that is aligned to a selected bond dissociation energy of the one or more target bonds.

9. The system of claim 1, wherein the at least one optical filter comprises a bandpass filter.

10. A system for fluid remediation comprising:
a chamber having an interior and an exterior, one or more inlet ports, and one or more outlet ports,
one or more energy of dissociation sources coupled to a pulse generator, and
one or more fluid treatment units coupled to the one or more inlet ports of the chamber,
wherein the system is configured so that fluid is capable of flowing into the chamber through the one or more inlet ports, through the one or more fluid treatment units proximate to the one or more energy of dissociation sources for treatment of the fluid, and out of the chamber through the one or more outlet ports,
wherein the one or more energy of dissociation sources is configured to provide one or more pulses of energy in an effective amount, intensity, pulse frequency, and pulse duration to dissociate one or more target bonds in one or more target molecules present in the fluid to dissociate the one or more target molecules into component products comprising ions or atoms of elements found within the one or more target molecules with a chemical formula distinct from the one or more target molecules,
wherein the one or more pulses of energy comprises pulses of ultraviolet light, and
wherein the one or more energy of dissociation sources comprises a diode connected to the pulse generator.

11. The system of claim 10, wherein the system is further configured to provide swirling fluid flow for treating all the fluid flowing through the chamber with the ultraviolet light, wherein said fluid comprises water, and wherein said one or more fluid treatment units comprise one or more water treatment units.

12. The system of claim 10, wherein the system comprises an optical filter disposed to filter the pulses of ultraviolet light.

13. The system of claim 10, wherein the ultraviolet light is tuned to specific a narrow wavelength band in accordance with said one or more target bonds.

14. The system of claim 10, wherein the ultraviolet light is tuned for dissociation of said one or more target bonds, and
wherein the chamber comprises a reflective lining.

15. The system of claim 10, wherein the diode is tuned for dissociation of said one or more target bonds.

16. The system of claim 10, wherein the one or more energy of dissociation sources is configured to produce a selected wavelength band of the ultraviolet light that is aligned with a selected bond dissociation energy of the one or more target bonds.

17. A system for fluid remediation comprising:
a chamber having an interior and an exterior, one or more inlet ports, and one or more outlet ports,
one or more energy of dissociation sources coupled to a pulse generator, and
one or more fluid treatment units coupled to the one or more inlet ports of the chamber,
wherein the system is configured so that fluid is capable of flowing into the chamber through the one or more inlet ports, through the one or more fluid treatment units proximate to the one or more energy of dissociation sources for treatment of the fluid, and out of the chamber through the one or more outlet ports,
wherein the one or more energy of dissociation sources is configured to provide one or more pulses of energy in an effective amount, intensity, pulse frequency, and pulse duration to dissociate one or more target bonds in one or more target molecules present in the fluid to dissociate the one or more target molecules into component products comprising ions or atoms of elements found within the one or more target molecules with a chemical formula distinct from the one or more target molecules, and
wherein the one or more energy of dissociation sources comprises:
a protective tube, and
one or more flash tubes disposed within an interior of the protective tube and operable to produce ultraviolet light in a wavelength range of 185 to 280 nanometers,
wherein an optical filter is disposed to filter the produced ultraviolet light and is operable to:
permit light transmission in a selected portion of the wavelength range that includes a wavelength of 254 nanometers, and
suppress light transmission in another portion of the wavelength range that is outside the selected portion of the wavelength range.

18. The system of claim 17, wherein the one or more target bonds comprises a bond having a bond dissociation energy, and
wherein the selected portion of the wavelength range is aligned to said bond dissociation energy.

19. The system of claim 17, wherein the selected portion of the wavelength range is selected for dissociation of said one or more target bonds, and wherein said one or more flash tubes comprises at least one U-shaped flash tube.

20. The system of claim 17, wherein said operability to suppress light transmission in another portion of the wavelength range comprises
an operability to suppressing production of unwanted byproducts,
wherein said fluid comprises water, and
wherein said one or more fluid treatment units comprise one or more water treatment units.

* * * * *